(12) United States Patent
Shin et al.

(10) Patent No.: US 12,499,617 B2
(45) Date of Patent: Dec. 16, 2025

(54) METHOD AND ELECTRONIC DEVICE FOR GENERATING THREE-DIMENSIONAL (3D) MODEL

(71) Applicant: Samsung Electronics Co., Ltd., Suwon-si (KR)

(72) Inventors: Jaewook Shin, Suwon-si (KR); Dongchan Kim, Suwon-si (KR); Dongnam Byun, Suwon-si (KR); Jinyoung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 18/454,402

(22) Filed: Aug. 23, 2023

(65) Prior Publication Data

US 2024/0119666 A1    Apr. 11, 2024

Related U.S. Application Data

(63) Continuation of application No. PCT/KR2023/012359, filed on Aug. 21, 2023.

(30) Foreign Application Priority Data

Oct. 7, 2022    (KR) .................. 10-2022-0129036
Dec. 23, 2022   (KR) .................. 10-2022-0183216

(51) Int. Cl.
  *G06T 17/00*    (2006.01)
  *G06T 7/50*     (2017.01)
  (Continued)

(52) U.S. Cl.
  CPC ............. *G06T 17/00* (2013.01); *G06T 7/50* (2017.01); *G06T 7/70* (2017.01); *G06T 19/20* (2013.01);
  (Continued)

(58) Field of Classification Search
  CPC .. G06T 7/50; G06T 7/70; G06T 17/00; G06T 19/20; G06T 2219/2004; G06T 2219/2016; G06T 2219/2021; G06V 10/764
  See application file for complete search history.

(56) References Cited

U.S. PATENT DOCUMENTS 9,978,177 B2   5/2018  Mehr et al.
11,257,287 B2  2/2022  Balestra et al.
(Continued)

FOREIGN PATENT DOCUMENTS

CN    106446010 A    2/2017
EP    3 179 407 B1   7/2022
(Continued)

OTHER PUBLICATIONS

International Search Report dated Nov. 20, 2023, issued in International Patent Application No. PCT/KR2023/012359.
(Continued)

*Primary Examiner* — Daniel F Hajnik
*Assistant Examiner* — Jed-Justin Imperial
(74) *Attorney, Agent, or Firm* — Jefferson IP Law, LLP

(57) ABSTRACT

A method of generating a three-dimensional (3D) model and a device for generating a 3D model are provided. The method includes generating a base 3D model of an object, determining a first target 3D model similar to the base 3D model from a 3D model database storing a plurality of 3D models, generating a first synthesized 3D model, determining a first similarity between the first synthesized 3D model and the at least one object image, determining a component having a low similarity between the first synthesized 3D model and the at least one object image, determining, as a second target 3D model, a 3D model having a high similarity to the first synthesized 3D model with respect to the com-
(Continued)

ponent having the low similarity, from the 3D model database, and generating a second synthesized 3D model.

20 Claims, 25 Drawing Sheets

(51) Int. Cl.
 *G06T 7/70* (2017.01)
 *G06T 19/20* (2011.01)
 *G06V 10/764* (2022.01)
(52) U.S. Cl.
 CPC .... *G06V 10/764* (2022.01); *G06T 2219/2004* (2013.01); *G06T 2219/2016* (2013.01); *G06T 2219/2021* (2013.01)

(56) References Cited

U.S. PATENT DOCUMENTS

| | | | |
|---|---|---|---|
| 11,276,226 | B2 | 3/2022 | Lim |
| 2017/0004621 | A1* | 1/2017 | Maranzana ............... G06T 7/66 |
| 2019/0147221 | A1* | 5/2019 | Grabner .................... G06T 7/75 |
| | | | 382/103 |
| 2020/0005020 | A1* | 1/2020 | Meany ................. G06F 16/284 |
| 2020/0160616 | A1 | 5/2020 | Li et al. |
| 2021/0104071 | A1* | 4/2021 | Shao ........................ G06T 7/97 |
| 2021/0383115 | A1* | 12/2021 | Alon ....................... A63F 13/77 |
| 2022/0301324 | A1* | 9/2022 | Gustavsson .......... G06V 10/768 |
| 2022/0358770 | A1 | 11/2022 | Guler et al. |

FOREIGN PATENT DOCUMENTS

| | | |
|---|---|---|
| JP | 2005-071095 A | 3/2005 |
| KR | 10-2016-0090622 A | 8/2016 |
| KR | 10-1906431 B1 | 10/2018 |
| KR | 10-2019-0112428 A | 10/2019 |
| KR | 10-2020-0056905 A | 5/2020 |
| KR | 10-2207855 B1 | 1/2021 |
| KR | 10-2021-0028941 A | 3/2021 |
| KR | 10-2021-0078813 A | 6/2021 |
| KR | 10-2022-0024517 A | 3/2022 |

OTHER PUBLICATIONS

Extended European Search Report dated Jul. 25, 2025, issued in a European Patent Application No. 23875042.6.

* cited by examiner

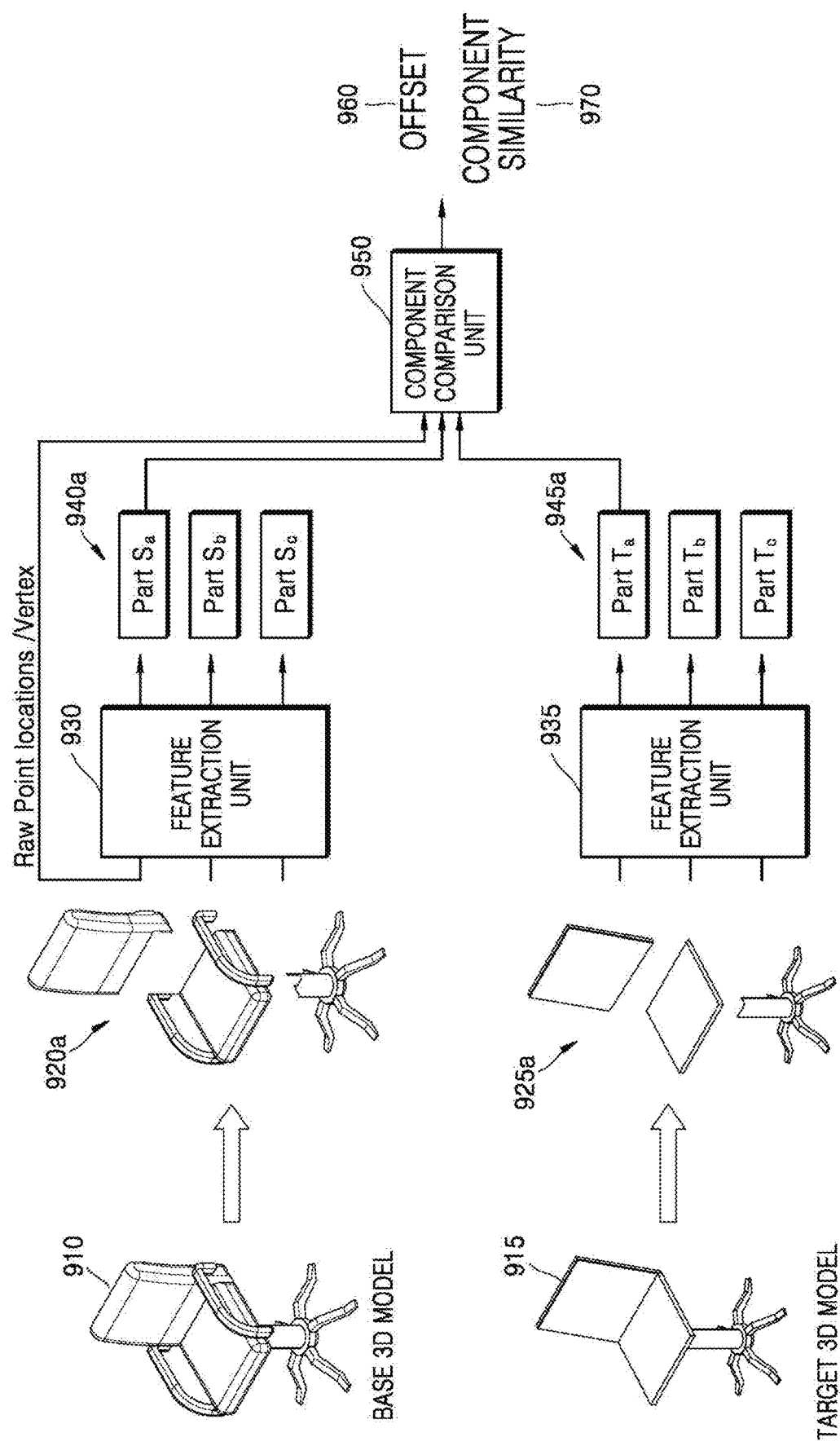

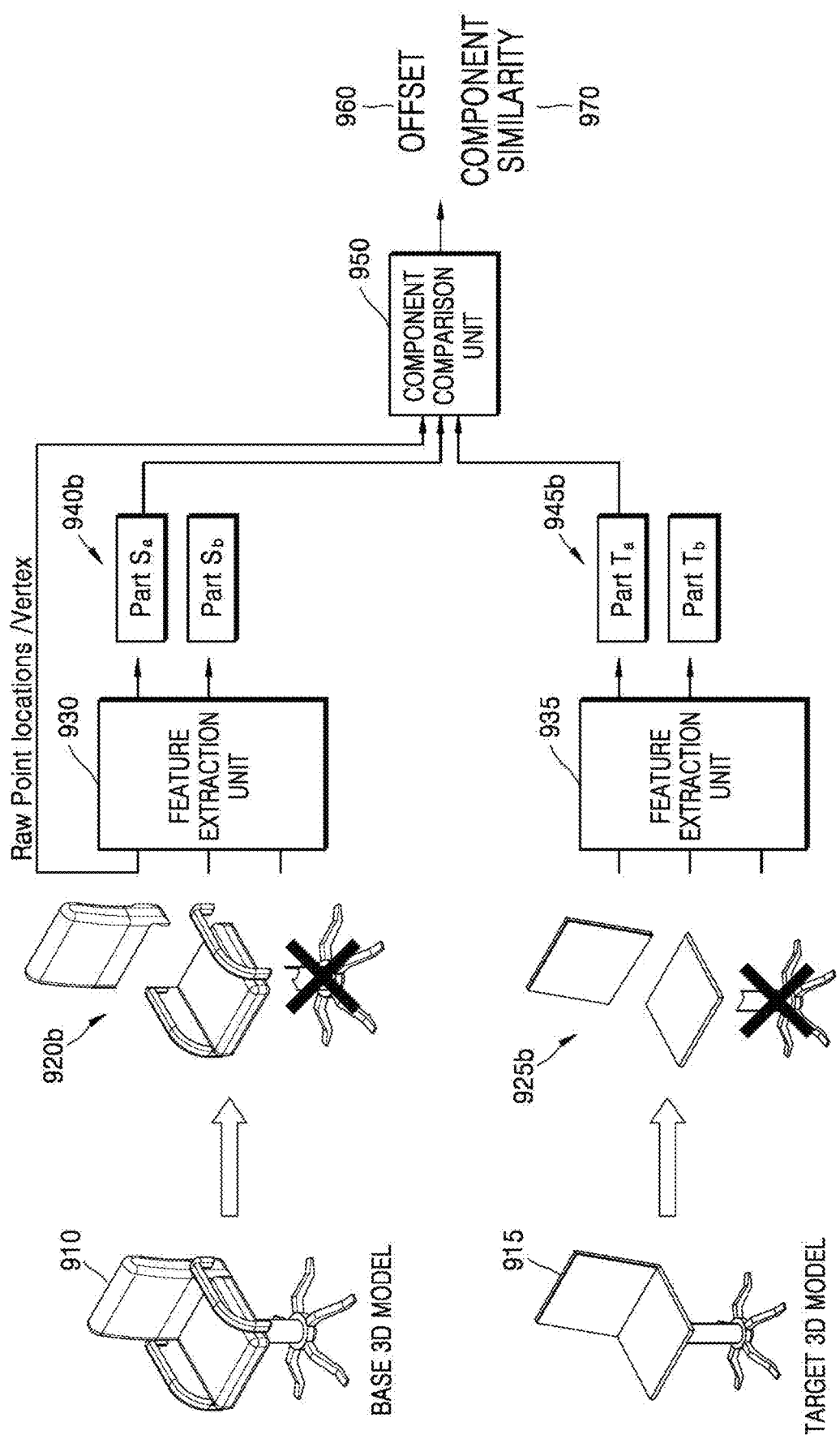

METHOD AND ELECTRONIC DEVICE FOR GENERATING THREE-DIMENSIONAL (3D) MODEL

CROSS-REFERENCE TO RELATED APPLICATION(S)

This application is a continuation application, claiming priority under § 365(c), of an International application No. PCT/KR2023/012359, filed on Aug. 21, 2023, which is based on and claims the benefit of a Korean patent application number 10-2022-0129036, filed on Oct. 7, 2022, in the Korean Intellectual Property Office, and of a Korean patent application number 10-2022-0183216, filed on Dec. 23, 2022, in the Korean Intellectual Property Office, the disclosure of each of which is incorporated by reference herein in its entirety.

TECHNICAL FIELD

The disclosure relates to a method and electronic device for generating a three-dimensional (3D) model. More particularly, the disclosure relates to a method and electronic device for generating a 3D model by using a 3D model database.

BACKGROUND ART

As the development of augmented reality (AR), virtual reality (VR), and metaverse continues, three-dimensional (3D) modeling technology that generates a 3D model for displaying an object in a 3D space is emerging.

Recently, according to the rapid development in the field of computer vision, an artificial intelligence (AI) model that generates a 3D model using dozens of two-dimensional (2D) pictures is being developed. Such an AI model is trained to infer a 3D model using dozens of pictures taken at a certain location. However, because such an AI model requires many images captured at a certain location, a 3D modeling technique using a small number of images may be required for user convenience.

The above information is presented as background information only to assist with an understanding of the disclosure. No determination has been made, and no assertion is made, as to whether any of the above might be applicable as prior art with regard to the disclosure.

DISCLOSURE

Aspects of the disclosure are to address at least the above-mentioned problems and/or disadvantages and to provide at least the advantages described below. Accordingly, an aspect of the disclosure is to provide a method and electronic device for generating a 3D model by using a 3D model database.

Additional aspects will be set forth in part in the description which follows and, in part, will be apparent from the description, or may be learned by practice of the presented embodiments.

Technical Solution

According to an embodiment of the disclosure, a method of generating a three-dimensional (3D) model is provided. The method of generating the 3D model may include generating a base 3D model of an object, based on at least one object image of the object. The method of generating the 3D model may include determining a first target 3D model similar to the base 3D model from a 3D model database storing a plurality of 3D models. The method of generating the 3D model may include generating a first synthesized 3D model, based on the base 3D model and the first target 3D model. The method of generating the 3D model may include determining a first similarity between the first synthesized 3D model and the at least one object image. The method of generating the 3D model may include determining a component having a low similarity between the first synthesized 3D model and the at least one object image, based on the first similarity being less than or equal to a threshold value. The method of generating the 3D model may include determining, as a second target 3D model, a 3D model having a high similarity to the first synthesized 3D model with respect to the component having the low similarity, from the 3D model database. The method of generating the 3D model may include generating a second synthesized 3D model, based on the first synthesized 3D model and the second target 3D model.

According to an embodiment of the disclosure, at least one non-transitory computer-readable recording medium storing a program for performing the above-described method is provided.

According to an embodiment of the disclosure, an electronic device for generating a three-dimensional (3D) model is provided. The electronic device may include at least one processor. The electronic device may include a memory storing at least one instruction. The at least one processor may be configured to execute the at least one instruction to generate a base 3D model of an object, based on at least one object image of the object. The at least one processor may be configured to execute the at least one instruction to determine a first target 3D model similar to the base 3D model from a 3D model database storing a plurality of 3D models. The at least one processor may be configured to execute the at least one instruction to generate a first synthesized 3D model, based on the base 3D model and the first target 3D model. The at least one processor may be configured to execute the at least one instruction to determine a first similarity between the first synthesized 3D model and the at least one object image. The at least one processor may be configured to execute the at least one instruction to determine a component having a low similarity between the first synthesized 3D model and the at least one object image, based on the first similarity being less than or equal to a threshold value. The at least one processor may be configured to execute the at least one instruction to determine, as a second target 3D model, a 3D model having a high similarity to the first synthesized 3D model with respect to the component having the low similarity, from the 3D model database. The at least one processor may be configured to execute the at least one instruction to generate a second synthesized 3D model, based on the first synthesized 3D model and the second target 3D model.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 9A is a view illustrating a process of obtaining information for performing deformation on a 3D model according to an embodiment of the disclosure;

FIG. 9B is a view illustrating a process of obtaining information for performing deformation on a 3D model according to an embodiment of the disclosure;

Throughout the drawings, it should be noted that like reference numbers are used to depict the same or similar elements, features, and structures.

MODE FOR INVENTION

Figure 1:
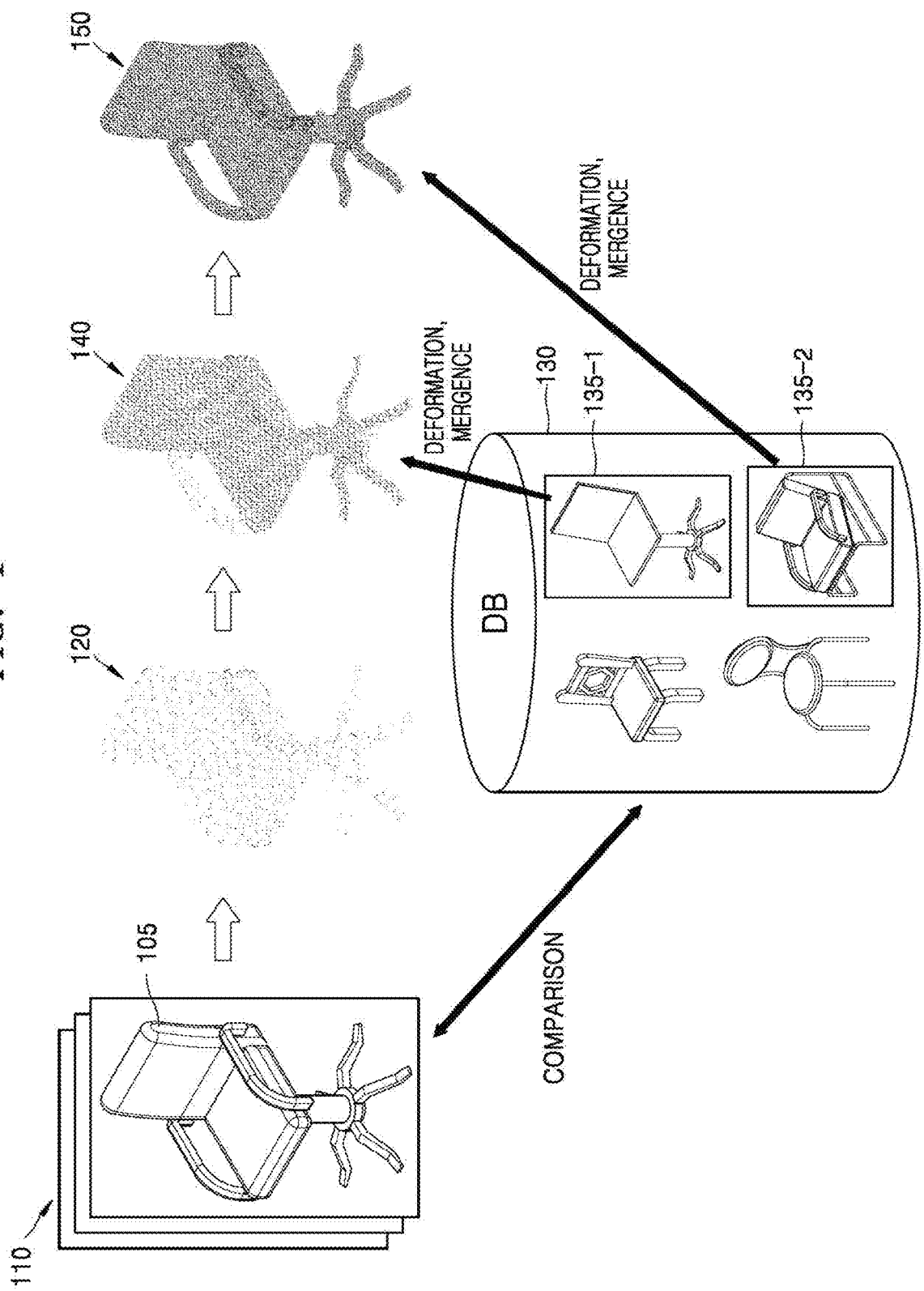
FIG. 1 is a view illustrating a method of generating a three-dimensional (3D) model according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part. Therefore, the terms used in the disclosure should not be interpreted based on only their names but have to be defined based on the meaning of the terms together with the descriptions throughout the disclosure.

All terms used herein, including technical and scientific terms, have the same meaning as generally understood by those of ordinary skill in the art. While the term including an ordinal number, such as "first" or "second" used herein may be used to describe various components, such components must not be limited to the above terms. These terms are used only to distinguish one component from another component.

When a part "includes" or "comprises" an element throughout the specification, unless there is a particular description contrary thereto, the part may further include other elements, not excluding the other elements. In addition, the term, such as "unit" or "module" used herein refers to a unit for processing at least one function or operation, and this may be implemented by hardware, software, or a combination of hardware and software.

As the disclosure allows for various changes and numerous embodiments of the disclosure, particular embodiments will be illustrated in the drawings and described in the written description. However, this is not intended to limit the disclosure to particular modes of practice, and it is to be appreciated that all changes, equivalents, and substitutes that do not depart from the spirit and technical scope of numerous embodiments are encompassed in the disclosure.

In the description of embodiments of the disclosure, certain detailed explanations of the related art are omitted when it is deemed that they may unnecessarily obscure the essence of the disclosure. In addition, numbers (e.g., first, second, or the like) used in the description of the specification are only identification symbols for distinguishing one component from another component.

In addition, in an embodiment of the disclosure, when a component is said to "be connected" to another component, the component may be directly connected to the other component, but unless otherwise mentioned, it is to be appreciated that the component is connected to the other component with another component located therebetween.

In addition, in an embodiment of the disclosure, regarding components expressed as " . . . unit", " . . . module", and the like, two or more components may be combined into one component, or one component may be divided into two or more components according to subdivided functions. In addition, each component described hereinafter may additionally perform some or all of functions performed by another component, in addition to main functions of itself, and some of the main functions of each component may be performed entirely by another component.

Functions related to artificial intelligence (AI) according to the disclosure are operated through a processor and a memory. The processor may include at least one processor. In this regard, the at least one processor may be a general-purpose processor, such as a central processing unit (CPU), an application processor (AP), or a digital signal processor (DSP), a dedicated graphics processor, such as a graphics processing unit (GPU) or a vision processing unit (VPU), or an AI-dedicated processor, such as a neural processing unit (NPU). The at least one processor may be controlled to process input data according to a predefined operation rule stored in the memory or an AI model. Alternatively, when the at least one processor is an AI-dedicated processor, the AI-dedicated processor may be designed in a hardware structure specialized for processing a specific AI model.

The predefined operation rule or the AI model are made through training. Here, the expression "made through training" means that an existing AI model is trained based on a learning algorithm by using a large number of pieces of training data and thus made into a predefined operation rule or an AI model, which is set to fulfill an intended feature (or purpose). The training may be performed by a device itself, in which AI according to the disclosure is performed, or may be performed through a separate server and/or system. Examples of the learning algorithm include supervised learning, unsupervised learning, semi-supervised learning, and reinforcement learning, but are not limited thereto.

An AI model may include a plurality of neural network layers. Each of the neural network layers has a plurality of weight values and performs a neural network operation through an operation between an operation result of a previous layer and the plurality of weight values. The plurality of weight values that the neural network layers have may be optimized by a result of training of the AI model. For example, the plurality of weight values may be refined to reduce or minimize a loss value or cost value obtained by the AI model during a training process. An artificial neural network may include a deep neural network (DNN), and may be, for example, a convolutional neural network (CNN), a DNN, a recurrent neural network (RNN), a restricted Boltzmann machine (RBM), a deep belief network (DBN), a bidirectional recurrent deep neural network (BRDNN), or a deep Q-network, but is not limited thereto.

In an embodiment of the disclosure, the term "object image" may refer to an image including an object of a three-dimensional (3D) model to be generated. For example, an electronic device may generate a 3D model of a chair based on an object image of the chair.

In an embodiment of the disclosure, the term "base 3D model" may refer to a 3D model of an object generated based on an object image. For example, a base 3D model may refer to a 3D model inferred based on an object image without referring to a 3D model database. A base 3D model may include information about an object included in an object image. For example, when an object image is an image captured from the front of an object, a base 3D model may include information about the front of the object. When a plurality of object images are images captured from a plurality of different viewpoints of an object, a base 3D model may include information about the plurality of different viewpoints of the object.

In an embodiment of the disclosure, the term "target 3D model" may refer to a 3D model used to generate a synthesized 3D model from a 3D model database. For example, an electronic device may use a target 3D model included in a 3D model database to complement a base 3D model or a synthesized 3D model. A target 3D model may be a 3D model in which the number of pieces of information is greater than or equal to a certain value. For example, a target 3D model may be a 3D model including information sufficient to express an object through rendering.

In an embodiment of the disclosure, the term "synthesized 3D model" may refer to a 3D model generated based on a target 3D model. For example, an electronic device may generate a synthesized 3D model by using a base 3D model and a target 3D model. For example, an electronic device may generate a new synthesized 3D model by using a pre-generated synthesized 3D model and a target 3D model. An electronic device may generate a synthesized 3D model by increasing the amount of information of a base 3D model or the amount of information of a pre-generated synthesized 3D model, based on information of a target 3D model.

FIG. 1 is a view illustrating a method of generating a 3D model, according to an embodiment of the disclosure.

Referring to FIG. 1, an electronic device 100 may obtain an object image 110 of an object 105. There are various methods regarding types of 3D models, but for convenience of explanation, description is provided based on a point cloud method. The types of 3D models are described with reference to FIG. 3.

The electronic device 100 may photograph the object 105 or receive and obtain the object image 110 from the outside. For example, the electronic device 100 may obtain the object image 110 by photographing the object 105 from various angles. For example, the object image 110 may be a two-dimensional (2D) image or a 3D image, which is captured by the electronic device 100, or may be a 3D image generated based on a 2D image captured by the electronic device 100. The object image 110 may be a 2D image including color information or a 3D image including color information and depth information. For example, the object image 110 may be a 2D image including color information, such as a red green blue (RGB) image, or may be an image including color information and depth information, such as an RGB-depth (D) image, but is not limited thereto, and may be an image of various color spaces.

The electronic device 100 according to an embodiment of the disclosure may generate a base 3D model 120 based on the object image 110. The base 3D model 120 may be a 3D model inferred by using the object image 110. A method of generating a base 3D model according to an embodiment of the disclosure is described with reference to FIG. 5.

The electronic device 100 according to an embodiment of the disclosure may determine a first target 3D model 135-1 from a 3D model database 130. The 3D model database 130 may be information about a 3D model, which is stored in the electronic device 100 or an external electronic device. The electronic device 100 may determine, as the first target 3D model 135-1, a 3D model similar to the base 3D model 120 from the 3D model database 130.

The electronic device 100 according to an embodiment of the disclosure may generate a first synthesized 3D model 140 based on the base 3D model 120 and the first target 3D model 135-1. The electronic device 100 may perform a deformation process on the first target 3D model 135-1, and may generate the first synthesized 3D model 140 by merging the deformed first target 3D model 135-1 and the base 3D model 120. The electronic device 100 may generate the first synthesized 3D model 140 having a large amount of information about a 3D model by merging the base 3D model 120 having little information about the 3D model (for example, information about the 3D model, such as points or vertices) and the first target 3D model 135-1. A process of performing deformation and synthesis by the electronic device 100 according to an embodiment of the disclosure is described with reference to FIGS. 8, 9A, 9B, and 10.

The electronic device 100 according to an embodiment of the disclosure may determine a second target 3D model 135-2 from the 3D model database 130. The electronic device 100 may determine, as the second target 3D model 135-2, a 3D model similar to the first synthesized 3D model 140 from the 3D model database 130. The electronic device 100 may classify the first synthesized 3D model 140 into a plurality of components. For example, a component of the first synthesized 3D model 140 may refer to a set of points having similar characteristics among a plurality of points included in the first synthesized 3D model 140. For example, when the first synthesized 3D model 140 is a 3D model of a chair, the components may include a backrest, a seat, a leg, and armrests, and points belonging to the same component may have similar characteristics, whereas points belonging to different components may have different characteristics.

The electronic device 100 may determine a component having a large difference from the object image 110 from among the plurality of components classified from the first synthesized 3D model 140, by comparing the first synthesized 3D model 140 with the object image 110. The electronic device 100 may determine, as the second target 3D model 135-2, a 3D model including a component similar to the component having a large difference from the object image 110 among the components of the first synthesized 3D model 140, from the 3D model database 130. For example, because the first synthesized 3D model 140 lacks the amount of 3D model information about armrests, the electronic device 100 may determine that a difference between the first synthesized 3D model 140 and the object image 110 is large with respect to armrests, and the electronic device 100 may determine, as the second target 3D model 135-2, a 3D model having armrests similar to armrests of the first synthesized 3D model 140.

The electronic device 100 according to an embodiment of the disclosure may generate a second synthesized 3D model 150 by merging the first synthesized 3D model 140 and the second target 3D model 135-2. According to an embodiment of the disclosure, a process of generating the second synthesized 3D model 150 by the electronic device 100 has been described, but may be repeatedly performed until the object image 110 and a synthesized 3D model satisfy a certain similarity.

The electronic device 100 may generate a 3D model from a small number of object images by supplementing information about the 3D model by using a 3D model stored in a database. For example, the electronic device 100 may generate a 3D model having a large amount of information from a 3D model having a small amount of information, which is generated from a small number of object images, by using a 3D model stored in a database. When the 3D model having a small amount of information is rendered, the 3D model having a small amount of information may have a large difference from a target 3D model to be implemented, whereas the 3D model having a large amount of information may have a small difference from the target 3D model. The number of images required for the electronic device 100 to generate a 3D model may be less than the number of images required in related technologies.

Figure 2:
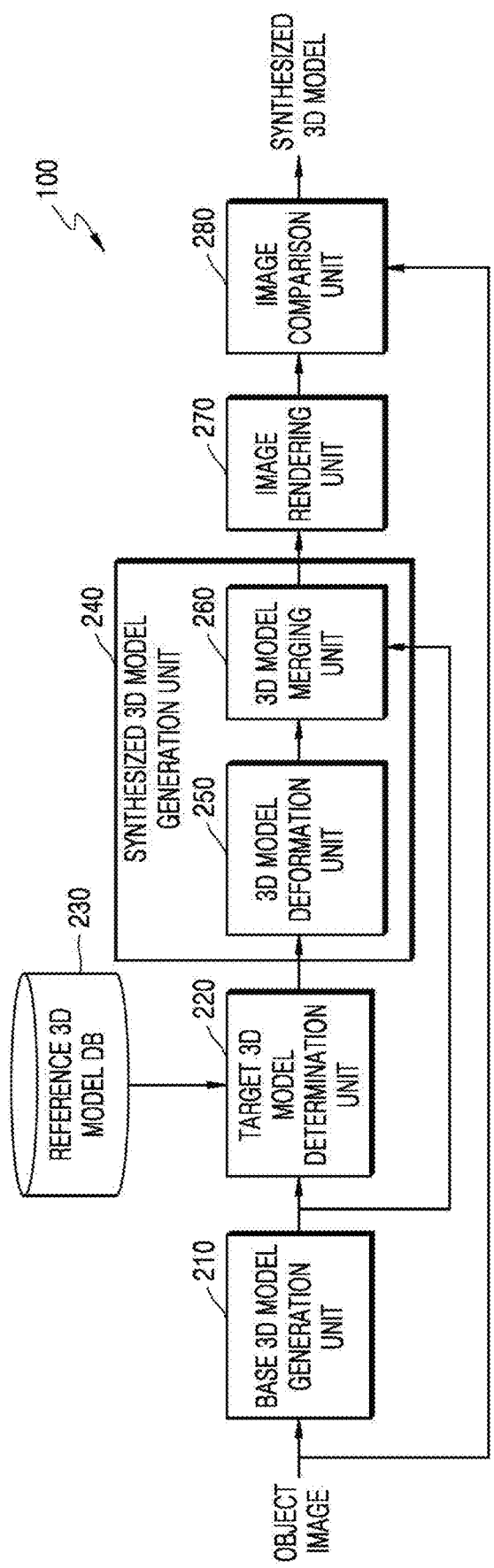
FIG. 2 is a view illustrating a method of generating a 3D model according to an embodiment of the disclosure.

FIG. 2 is a view illustrating a method of generating a 3D model according to an embodiment of the disclosure.

Referring to FIG. 2, the electronic device 100 may include a base 3D model generation unit 210, a target 3D model determination unit 220, a synthesized 3D model generation unit 240, an image rendering unit 270, and an image comparison unit 280. The electronic device 100 may further include a reference 3D model DB 230.

According to an embodiment of the disclosure, the base 3D model generation unit 210 may generate a base 3D model from an object image. Referring to FIG. 1, the base 3D model generation unit 210 may generate the base 3D model 120 of an object based on the object image 110.

According to an embodiment of the disclosure, the target 3D model determination unit 220 may determine a target 3D model similar to the base 3D model from among 3D models stored in the reference 3D model DB 230.

According to an embodiment of the disclosure, the synthesized 3D model generation unit 240 may generate a synthesized 3D model by using the base 3D model and the target 3D model. A 3D model deformation unit 250 may perform a deformation process on the target 3D model. A 3D model merging unit 260 may merge the target 3D model and the base 3D model.

According to an embodiment of the disclosure, the image rendering unit 270 may render the synthesized 3D model.

According to an embodiment of the disclosure, the image comparison unit 280 may determine similarity by comparing the object image with a synthesized image. When the object image and the synthesized image have a certain similarity or higher, the image comparison unit 280 may determine the synthesized 3D model as a final 3D model.

According to an embodiment of the disclosure, when the image comparison unit 280 determines that the similarity between the object image and the synthesized image is less than a certain similarity, the target 3D model determination unit 220 may determine a target 3D model similar to the synthesized 3D model. The synthesized 3D model generation unit 240 may generate a new synthesized 3D model by merging the determined target 3D model and the previously generated synthesized 3D model. When the similarity between the synthesized 3D model and the object image is less than a certain similarity, the electronic device 100 may repeatedly perform a process of determining a target 3D model and generating a synthesized 3D model. According to an embodiment of the disclosure, a method, performed by the electronic device 100, of generating a synthesized 3D model is described with reference to FIG. 3.

Figure 3:
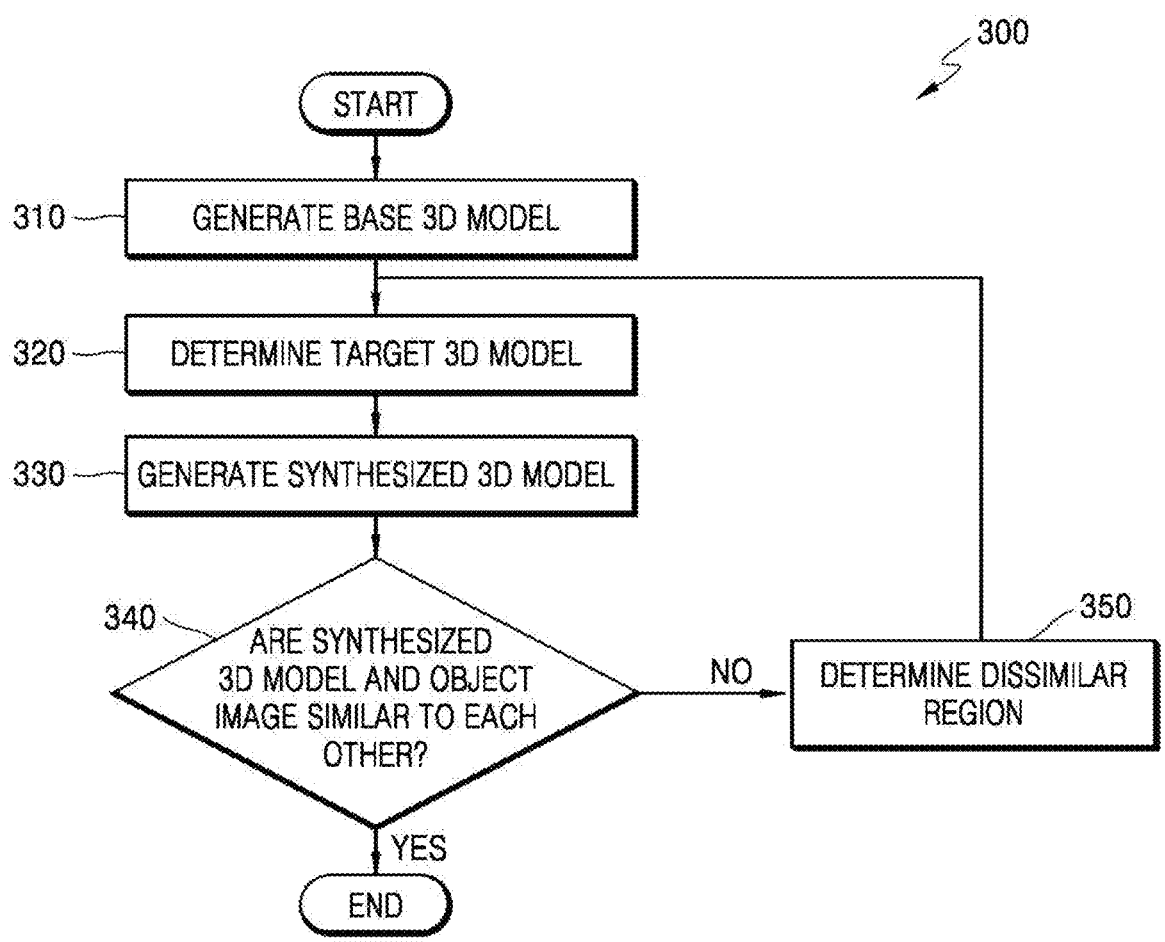
FIG. 3 is a flowchart of a method of generating a 3D model according to an embodiment of the disclosure.

FIG. 3 is a flowchart of a method of generating a 3D model according to an embodiment of the disclosure.

Referring to FIG. 3, a method 300 of generating a 3D model may start from operation 310. The method 300 of generating the 3D model according to an embodiment of the disclosure may be performed by an electronic device, but the disclosure is not limited thereto, and some operations may be performed by the electronic device 100, and some operations may be performed by an external electronic device.

In operation 310, the electronic device 100 may generate a base 3D model. According to an embodiment of the disclosure, the electronic device 100 may generate the base 3D model by using an object image. For example, the electronic device 100 may generate a point cloud base 3D model by using an RGB-D image. According to an embodiment of the disclosure, the electronic device 100 may generate an RGB-D image by using a plurality of RGB images.

In operation 320, the electronic device 100 may determine a target 3D model. The electronic device 100 may determine, as the target 3D model, a 3D model which is most similar to the base 3D model from a 3D model database. According to an embodiment of the disclosure, the electronic device 100 may determine, as the target 3D model, a 3D model which has a component most similar to a specific component of the base 3D model. For example, the electronic device 100 may determine, as a target 3D model, a 3D model which has a component most similar to an armrest component of a chair.

In operation 330, the electronic device 100 may generate a synthesized 3D model. The electronic device 100 may generate the synthesized 3D model based on the base 3D model and the target 3D model. The electronic device 100 may perform deformation on the target 3D model and generate the synthesized 3D model.

In operation 340, the electronic device 100 may determine whether the synthesized 3D model is similar to the object image. The electronic device 100 may render the synthesized 3D model and modify the rendered synthesized 3D model to be similar to the pose of the object image. The electronic device 100 may determine the similarity based on the modified synthesized 3D model and the object image. Based on the electronic device 100 determining that the modified synthesized 3D model and the object image are not similar to each other (for example, their similarity is less than a certain value), operation 350 proceeds. Based on the electronic device 100 determining that the modified synthesized 3D model and the object image are similar to each other (for example, their similarity is greater than or equal to a certain value), the operation ends.

In operation 350, the electronic device 100 may determine a region which is not similar between the synthesized 3D model and the object image. According to an embodiment of the disclosure, the region may refer to a component of the synthesized 3D model. The electronic device 100 may classify the synthesized 3D model into components of an object and determine the similarity to the object image for each component.

For example, the electronic device 100 may classify a chair into components, such as a backrest and armrests. The electronic device 100 may determine that the synthesized 3D model and the object image have similar backrests but do not have similar armrests among the components of the chair. The electronic device 100 may determine a component which is not similar between the synthesized 3D model and the object image, and operation 320 proceeds.

In operation 320, the electronic device 100 may determine, as the target 3D model, a 3D model similar to the synthesized 3D model. With respect to a component of the synthesized 3D model, which is determined not to be similar to a component of the object image in operation 350, the electronic device 100 may determine, as the target 3D model, a 3D model including a component similar to the component of the synthesized 3D model. For example, with respect to an armrest component determined not to be similar, the electronic device 100 may determine, as a target 3D model, a 3D model including an armrest component similar to that of a synthesized 3D model. According to an embodiment of the disclosure, when there are a plurality of components determined not to be similar, the electronic device 100 may determine a target 3D model for each component. According to an embodiment of the disclosure, when there are a plurality of components determined not to be similar, the electronic device 100 may determine one target 3D model including a component having the highest similarity with respect to the plurality of components determined not to be similar. In operation 330, the electronic device 100 may generate a new synthesized 3D model by using the previously generated synthesized 3D model and the target 3D model. The electronic device 100 may generate a synthesized 3D model similar to the object image by repeating operation 320 to operation 350.

Figure 4:
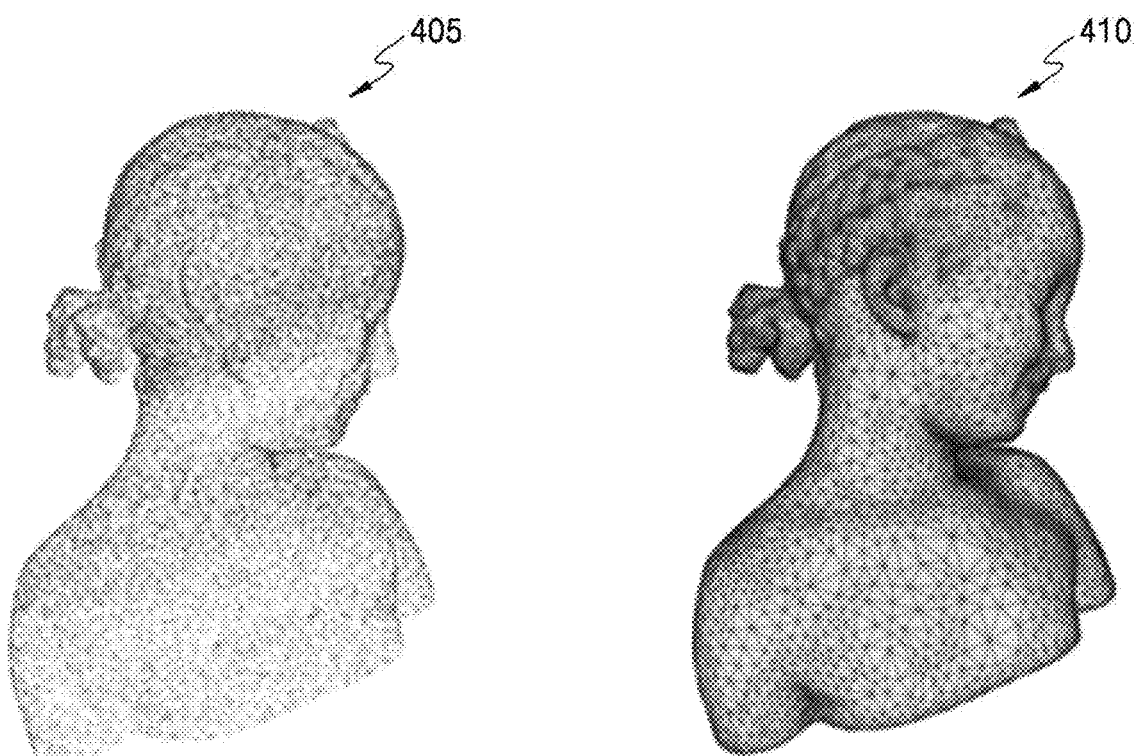
FIG. 4 is a view illustrating types of 3D models according to an embodiment of the disclosure.

FIG. 4 is a view illustrating types of 3D models according to an embodiment of the disclosure.

Referring to FIG. 4, the types of 3D models may include a point cloud 405 or a mesh 410.

The point cloud 405 is digitized data which visually defines an object in 3D space. As shown, the point cloud 405 may include a plurality of points. Each of the points may indicate the coordinates of an external point of the object. For example, each of the points may indicate a point on a boundary of the object. Each of the points may include an external coordinate value of the object corresponding to a 3D coordinate system. For example, each of the points may be expressed as a coordinate value of (x, y, z). Each of the points may include at least one attributes. For example, attributes of each of the points may include geometry, such as geographic location. For example, attributes of each of the points may include color, brightness, texture, motion, and material characteristics. Attributes other than geometry may be referred to as texture, and the texture represents various aspects and characteristics related to each of the points of the point cloud 405.

The mesh 410 is digitized data which visually defines an object in 3D space. As shown, the mesh 410 may include a plurality of points and connection relationships between the plurality of points.

Pictorial representation of the mesh 410 is defined as interconnection of several polygonal or triangular shapes of information between various points. For example, when various points are interconnected in a polygonal shape, it may be referred to as a polygon mesh. For example, when various points are interconnected in a triangular shape, it may be referred to as a triangle mesh. Each polygonal shape may include various pieces of information, such as an attribute. The attribute may include geometry and texture. The texture includes color reflection and motion. For example, terrain data provides information about connections between vertices, such as adjacency of vertices, edges, and surfaces. Geometric information provides a geometric location of each vertex in 3D space. Attribute information provides normal, color, and application-dependent information for each individual vertex. Vertices of each polygonal shape are similar to the points in the point cloud 405. Each polygonal shape of the mesh 410 represents an outer surface of an object.

For convenience of explanation, among the types of 3D models, the point cloud and the mesh have been described as examples, but the disclosure is not limited thereto, and a method of generating a 3D model according to the disclosure may be performed by using various types of 3D models, such as non-uniform rational B-spline (NURBS) or sculpting.

Figure 5:
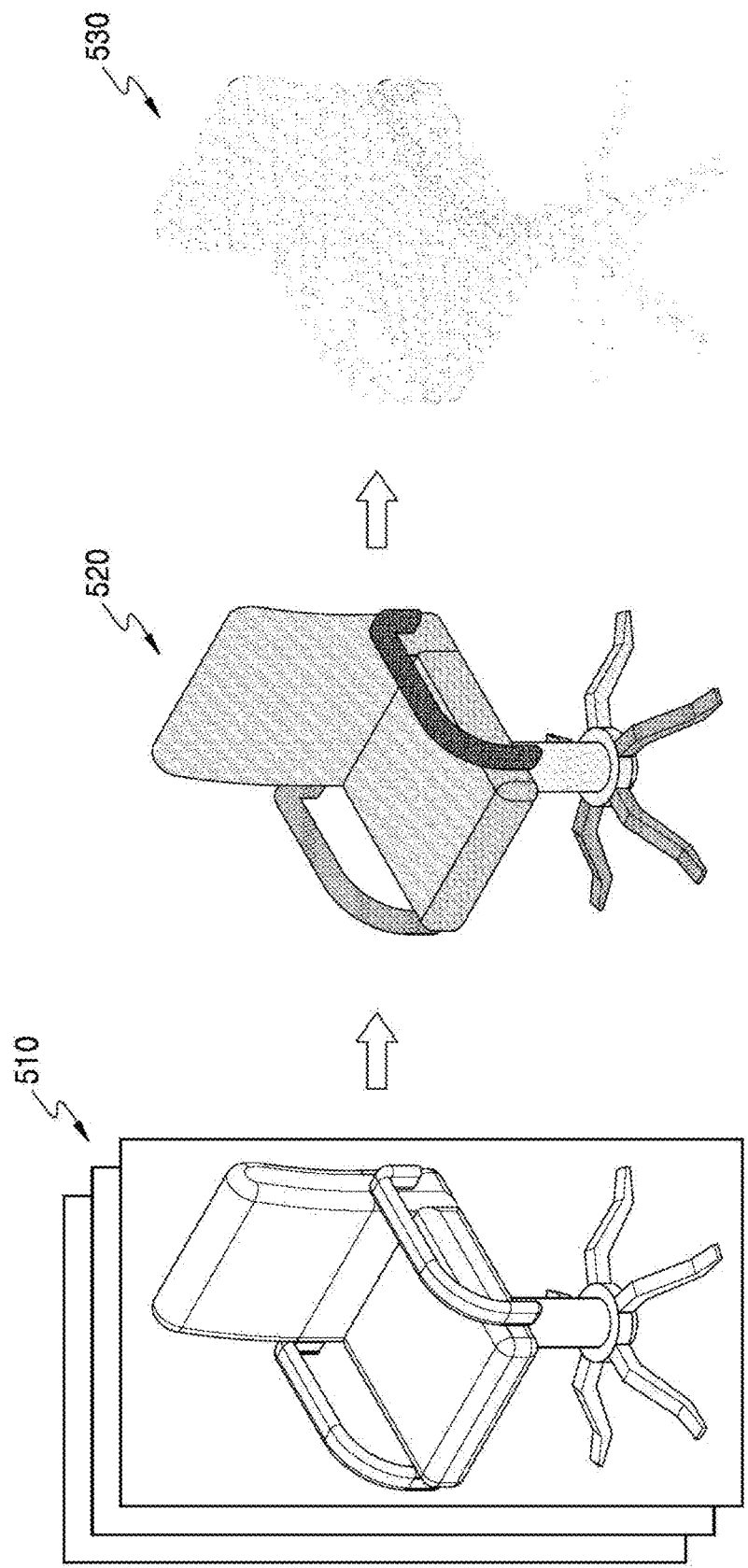
FIG. 5 is a view illustrating a process of generating a base 3D model based on an object image according to an embodiment of the disclosure.

FIG. 5 is a view illustrating a process of generating a base 3D model based on an object image according to an embodiment of the disclosure.

Referring to FIG. 5, a base 3D model 530 may be generated based on at least one object image 510. The at least one object image 510 and the base 3D model 530 according to an embodiment of the disclosure may respectively correspond to the object image 110 and the base 3D model 120 of FIG. 1.

The electronic device 100 according to an embodiment of the disclosure may obtain depth information based on the at least one object image 510. The electronic device 100 may generate a depth information image 520 including depth information. For example, a depth information image may be a depth image representing depth information of each pixel as a pixel value.

According to an embodiment of the disclosure, the depth information image 520 may be part of the at least one object image 510. For example, when the at least one object image 510 is an RGB-D image, the depth information image 520 may refer to a depth information image of the object image 510. According to an embodiment of the disclosure, the depth information image 520 may be generated based on the at least one object image 510. For example, when the at least one object image 510 is a 2D image, depth information corresponding to the at least one object image 510 may be estimated by using a plurality of images, and the depth information image 520 may be generated based on the estimated depth information.

The electronic device 100 according to an embodiment of the disclosure may generate the base 3D model 530 based on the depth information image 520. The electronic device 100 may obtain 3D coordinate values of each point by using depth information. The electronic device 100 may generate the base 3D model 530 based on the coordinate values of each point. The base 3D model 530 may be expressed in various methods, such as a point cloud or a mesh. As the number of the at least one object image 510 increases, the number of points of the base 3D model 530 increases, and the base 3D model 530 may accurately express an object.

Figure 6:
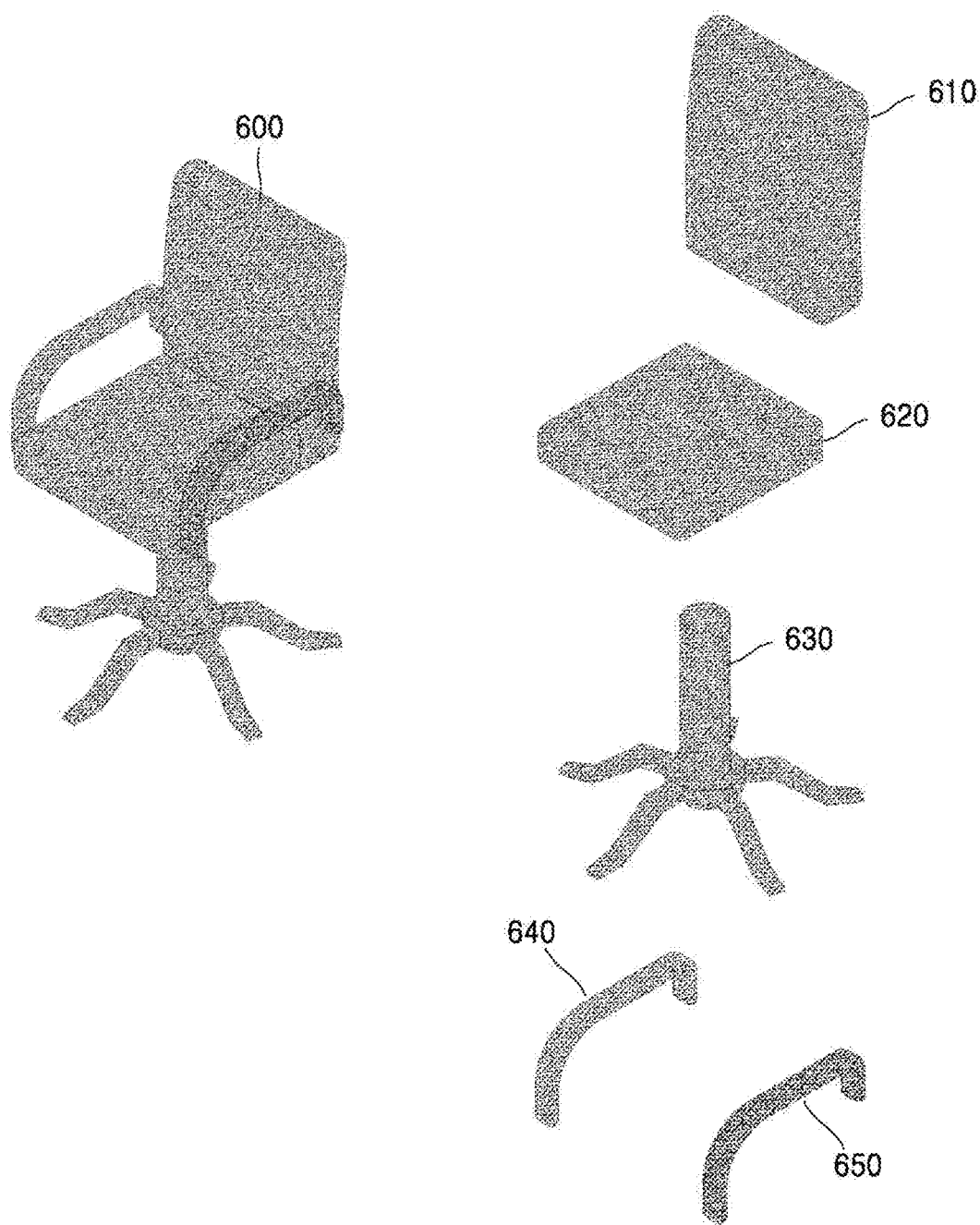
FIG. 6 is a view illustrating a process of classifying a 3D model into constituent units according to an embodiment of the disclosure.

FIG. 6 is a view illustrating a process of classifying a 3D model into constituent units according to an embodiment of the disclosure.

Referring to FIG. 6, a 3D model 600 may include a plurality of components 610, 620, 630, 640, and 650. The 3D model 600 of a chair may include the backrest 610, the seat 620, the leg 630, and the armrests 640 and 650. The 3D model 600 may be a base 3D model, a target 3D model, or a synthesized 3D model.

The electronic device 100 according to an embodiment of the disclosure may classify the 3D model 600 into the plurality of components 610, 620, 630, 640, and 650. The electronic device 100 may classify the 3D model 600 into the plurality of components 610, 620, 630, 640, and 650 by using an AI model which classifies a 3D model into semantic units. When a 3D model is input, the AI model may be trained to classify a plurality of points included in the 3D model according to components. The AI model may be trained by using training data including data in which component labels are specified with respect to each point or each cell unit of the 3D model.

The electronic device 100 may classify the 3D model 600 into the plurality of components 610, 620, 630, 640, and 650 based on clustering. The electronic device 100 may perform a clustering algorithm to classify information about each point or each cell unit of a 3D model into a set having similar characteristics. According to an embodiment of the disclosure, a set having similar characteristics, of a 3D model, may be referred to as a component of the 3D model.

According to an embodiment of the disclosure, a process, performed by the electronic device 100, of classifying the 3D model 600 into the plurality of components 610, 620, 630, 640, and 650 has been described, but the disclosure is not limited thereto, and the electronic device 100 may generate a 3D model based on an object image and classify the 3D model according to components at the same time.

The electronic device 100 may identify a component having a low similarity to an object image, in the 3D model 600, by classifying the 3D model 600 into the plurality of components 610, 620, 630, 640, and 650. The electronic device 100 may increase the similarity between the 3D model 600 and an object by supplementing information about the component of the 3D model 600, which has a low similarity. For example, the electronic device 100 may supplement information by increasing the amount of information about the component of the 3D model 600, which has a low similarity.

Figure 7:
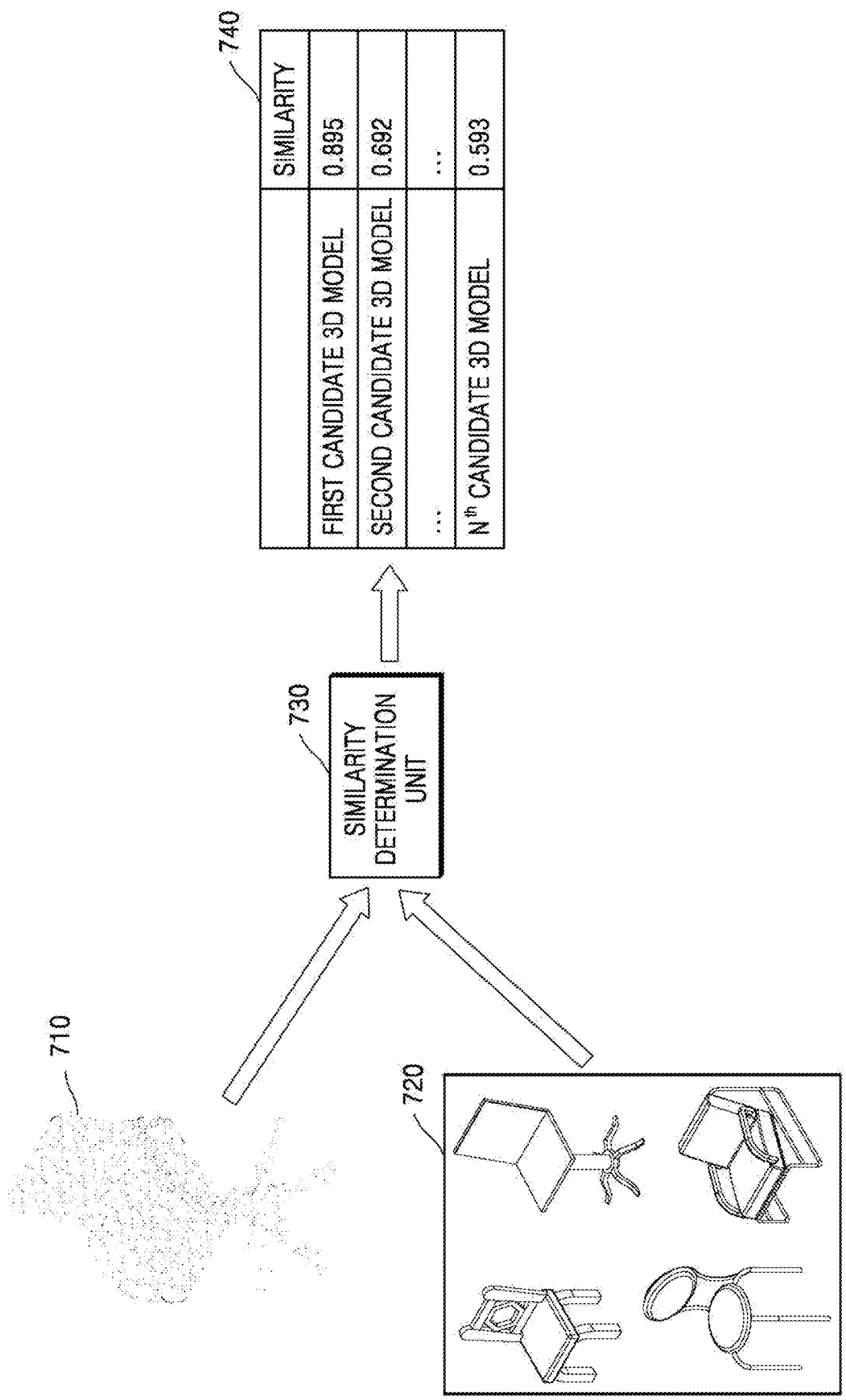
FIG. 7 is a view illustrating a process of determining the similarity between 3D models according to an embodiment of the disclosure.

FIG. 7 is a view illustrating a process of determining the similarity between 3D models according to an embodiment of the disclosure.

Referring to FIG. 7, a first 3D model 710 and a second 3D model 720 may each be a base 3D model, a target 3D model, a synthesized 3D model, or one of 3D models stored in a 3D model database. For convenience of explanation, it is assumed that the first 3D model 710 is a base 3D model and the second 3D model 720 is a 3D model included in the 3D model database.

The electronic device 100 may include a similarity determination unit 730. The similarity determination unit 730 may determine a similarity 740 between the first 3D model 710 and the second 3D model 720. According to an embodiment of the disclosure, the similarity determination unit 730 may determine the similarity 740 based on at least one of extrinsic parameters or intrinsic parameters of the first 3D model 710 and the second 3D model 720. An extrinsic parameter may include characteristics, such as the curvature or anisotropy of a 3D model. For example, the similarity determination unit 730 may determine the similarity by comparing the curvature of the first 3D model 710 with the curvature of the second 3D model 720. Alternatively or additionally, the similarity determination unit 730 may determine the similarity based on the location of a point included in the first 3D model 710 and the location of a point of the second 3D model 720. For example, the similarity determination unit 730 may determine the similarity based on a distance (for example, Euclidean distance) between a first point included in the first 3D model 710 and a second point of the second 3D model 720 corresponding to the first point. The second point may be a point which is most similar in location to the first point, among points included in the second 3D model 720.

The smaller the distance between corresponding points, the higher the similarity may be determined.

According to an embodiment of the disclosure, the similarity determination unit 730 may include an AI model trained to predict characteristics of the first 3D model 710 and the second 3D model 720 including at least one of extrinsic parameters or an intrinsic parameters. The more similar the first 3D model 710 and the second 3D model 720 are, the higher the similarity the AI model may be trained to show.

The similarity determination unit 730 may determine the similarity 740 by comparing the first 3D model 710 with second 3D model 720 as a whole, or may determine the similarity 740 by comparing portions of the first 3D model 710 and the second 3D model 720. For example, the similarity determination unit 730 may determine the similarity by comparing an "armrest" component of the first 3D model 710 with an "armrest" component of the second 3D model 720.

The electronic device 100 may determine the similarity 740 to the first 3D model 710 by using, as the second 3D model 720, a plurality of 3D models included in the 3D model database. The similarity may represent a value between 0 and 1, but is not limited thereto, and may be evaluated in various ways. The similarity determination unit 730 may compare the first 3D model 710 with the second 3D model 720. The similarity determination unit 730 may determine their similarity in consideration that the smaller the difference, the higher the similarity.

According to an embodiment of the disclosure, the electronic device 100 may determine, as a target 3D model, the second 3D model 720 having the highest similarity 740. For example, a first candidate 3D model having the highest similarity among the plurality of 3D models (candidate 3D models) included in the 3D model database may be determined as the target 3D model. The electronic device 100 may supplement little data by using the most similar 3D model among pre-generated 3D models. For example, the electronic device 100 may supplement data by increasing the amount of data in a base 3D model having little data (for example, point information and vertex information) by using data included a target 3D model.

According to an embodiment of the disclosure, the similarity determination unit 730 may be included in the target 3D model determination unit 220 of FIG. 2. The target 3D model determination unit 220 may determine a target 3D model based on the similarity determined by the similarity determination unit 730.

According to an embodiment of the disclosure, a method of determining the similarity when the first 3D model 710 is a base 3D model and the second 3D model 720 is a 3D model included in a 3D model database has been described, but the disclosure is not limited thereto, and the first 3D model 710 and the second 3D model 720 may be represented in various cases including a case where the first 3D model 710 is a synthesized 3D model and the second 3D model 720 is a 3D model included in a 3D model database.

Figure 8:
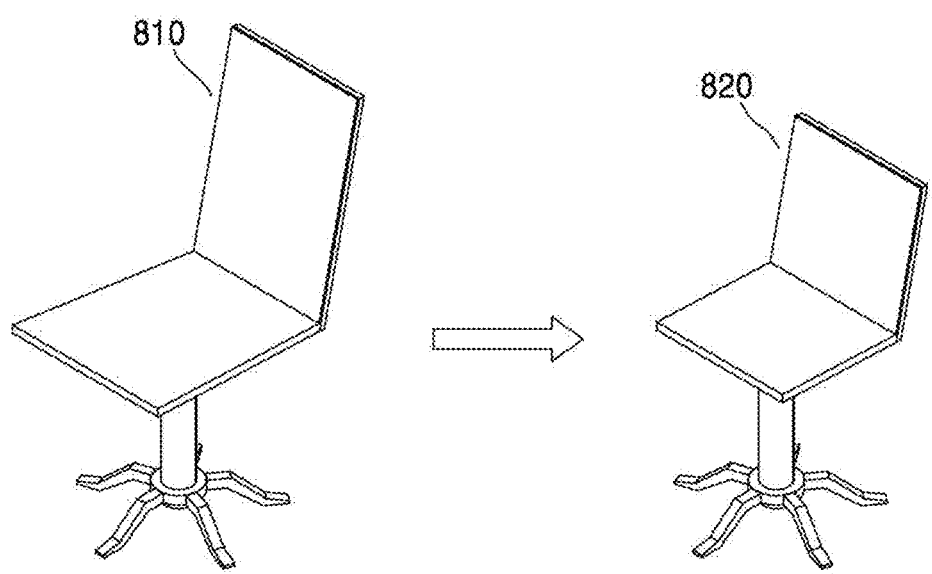
FIG. 8 is a view illustrating a process of deformation of a 3D model according to an embodiment of the disclosure.

FIG. 8 is a view illustrating a process of deformation of a 3D model according to an embodiment of the disclosure.

Throughout the disclosure, the term "deformation" may refer to a process of changing the location of each point of a 3D model. For example, it means changing the coordinates of any point of a 3D model from (x0, y0, z0) to (x1, y1, z1). As deformation is performed on a 3D model, the 3D model may obtain an effect similar to that obtained by performing rotation, translation, scaling, or the like thereon.

Throughout the disclosure, the term "offset" may refer to information about a change in location before and after deformation. For example, when the coordinates of any point of a 3D model is moved from (x0, y0, z0) to (x1, y1, z1) by deformation, an offset may be expressed as a 3D vector of (x1-x0, y1-y0, z1-z0). Offsets may be determined individually for each point of a 3D model.

Referring to FIG. 8, a 3D model 820 after deformation may be generated by changing the locations of points included in a 3D model 810 before deformation.

The electronic device 100 according to an embodiment of the disclosure may deform the 3D model 810. For example, the electronic device 100 may perform deformation on a target 3D model to merge a base 3D model or a synthesized 3D model and the target 3D model.

The electronic device 100 according to an embodiment of the disclosure may deform a target 3D model such that the 3D model 810 has distribution between points similar to distribution between points of another 3D model (not shown). For example, when a plurality of 3D models have different sizes (for example, when points of one 3D model are included in a regular hexahedron of 640×640×640, and points of another 3D model are included in a regular hexahedron of 40×40×40), distances distributed between points of the plurality of 3D models are different from each other. In the above example, when the plurality of 3D models are merged, a 3D model including inaccurate information may be generated. Therefore, the electronic device may modify the 3D model such that the plurality of 3D models having the same size, by performing a deformation process.

FIG. 9A is a view illustrating a process of obtaining information for performing deformation on a 3D model according to an embodiment of the disclosure.

Referring to FIG. 9A, an offset 960 and a component similarity 970 with respect to a base 3D model 910 and a target 3D model 915 may be determined by using feature extraction units 930 and 935 and a component comparison unit 950. The electronic device 100 may include the feature extraction units 930 and 935 and the component comparison unit 950. According to an embodiment of the disclosure, the 3D model merging unit 260 of FIG. 2 may include the feature extraction units 930 and 935 and the component comparison unit 950.

For convenience of explanation, a process of deforming the target 3D model 915 based on the base 3D model 910 by the electronic device 100 has been described, but a process of deforming the target 3D model 915 based on a synthesized 3D model by the electronic device 100 may also be performed in the same manner.

The target 3D model 915 may be a 3D model having the highest similarity to the base 3D model 910, in a 3D model database. According to an embodiment of the disclosure, the target 3D model 915 may be a 3D model having the highest similarity to the entire of the base 3D model 910.

The electronic device 100 may classify the base 3D model 910 and the target 3D model 915 into a plurality of components 920a and 925a. Alternatively, the electronic device 100 may obtain a 3D model classified into the plurality of components 920a and 925a.

The feature extraction units 930 and 935 may output features 940a of each component of the base 3D model and features 945a of each component of the target 3D model by inputting the plurality of components 920a of the base 3D model 910 and the plurality of components 925a of the target 3D model 915. For example, the feature extraction units 930 and 935 may output one-dimensional embedding vectors for the features 940a of each component of the base 3D model and the features 945a of each component of the target 3D model by using, as an input, a 3D model expressed as a point cloud or mesh, which is classified into a plurality of components. The feature extraction units 930 and 935 according to an embodiment of the disclosure may each be implemented as a convolutional neural network (CNN).

The component comparison unit 950 may output the offset 960 and the component similarity 970 based on a feature (for example, Part $S_a$) of one component among the features 940a of the base 3D model and a feature (for example, Part $T_a$) of one component among the features 945a of the target 3D model. According to an embodiment of the disclosure, the component comparison unit 950 may additionally input a 3D model corresponding to one component of the base 3D model (for example, a 3D model corresponding to Part $S_a$). For example, when the base 3D model is a point cloud, the component comparison unit 950 may obtain information about the locations of points of a 3D model corresponding to one component of the base 3D model 910. For example, when the base 3D model is a mesh, the component comparison unit 950 may obtain information about the locations of points of a 3D model corresponding to one component of the base 3D model 910 and information about connections between the points.

According to an embodiment of the disclosure, the component comparison unit 950 may compare features (for example, Part $S_a$, Part $S_b$, and Part $S_c$) of all components of the base 3D model 910 and features (for example, Part $T_a$, Part $T_b$, and Part $T_c$) of all components of the target 3D model 915. For example, in the case of FIG. 9A, when the base 3D model 910 and the target 3D model 915 each have three components, a total of nine component comparisons may be performed.

The offset 960 may be a vector for changing the target 3D model 915 to correspond to the base 3D model 910.

The component comparison unit 950 may determine the component similarity 970 between input 3D models. The component similarity 970 may refer to the similarity between a component of the input base 3D model 910 and a component of the target 3D model 915. When the component of the input base 3D model 910 corresponds to the component of the target 3D model 915, the component similarity 970 may show a high value. For example, when both the component of the input base 3D model 910 and the component of the target 3D model 915 represent armrests of a chair, the component similarity 970 may show a high value. When the component of the input base 3D model 910 does not correspond to the component of the target 3D model 915, the component similarity 970 may show a low value. For example, when the component of the input base 3D model 910 is armrests of a chair and the component of the target 3D model 915 is a backrest of a chair, the component similarity 970 may show a low value.

When the component similarity 970 between the target 3D model 915 and the base 3D model 910 is low, the electronic device 100 may not perform deformation. For example, when the component similarity 970 is a normalized value between 0 and 1 and the component similarity 970 is less than 0.5, the electronic device 100 may not perform deformation between the target 3D model 915 and the base 3D model 910.

According to an embodiment of the disclosure, as the component comparison unit 950 determines the component similarity 970 with respect to each component 940a of the base 3D model 910 and each component 945a of the target 3D model 915, the electronic device 100 may determine a component for performing deformation on the target 3D model 915. For example, the electronic device 100 may determine that a backrest component Part $T_a$ of the target 3D model 915 is deformed with reference to a backrest component Part $S_a$ of the base 3D model 910, based on the component similarity 970 of {Part $S_a$, Part $T_a$} being 0.5 or more. For example, the electronic device 100 may determine that the backrest component Part $T_a$ of the target 3D model 915 is not deformed with reference to a seat component Part $S_b$ of the base 3D model 910, based on the component similarity 970 of {Part $S_a$, Part $T_b$} being less than 0.5.

The electronic device 100 according to an embodiment of the disclosure may train the feature extraction units 930 and 935 and the component comparison unit 950 by using a training data set including an offset and component similarity between components of the base 3D model and components of the target 3D model. According to an embodiment of the disclosure, the feature extraction units 930 and 935 may each be implemented as a CNN, and the component comparison unit 950 may be implemented as a multilayer perceptron (MLP).

FIG. 9B is a view illustrating a process of obtaining information for performing deformation on a 3D model according to an embodiment of the disclosure.

Referring to FIG. 9B, some of components of the base 3D model 910 and the target 3D model 915 may not be deformed. For example, leg components among the components of the base 3D model 910 and the target 3D model 915 may not be deformed, and a 3D model corresponding to legs of the base 3D model 910 and the target 3D model 915 may not be input to the feature extraction units 930 and 935.

For convenience of explanation, a process of deforming the target 3D model 915 based on the base 3D model 910 by the electronic device 100 has been described, but a process of deforming the target 3D model 915 based on a synthesized 3D model by the electronic device 100 may also be performed in the same manner. For convenience of explanation, repeated descriptions given with reference to FIG. 9A are omitted.

The electronic device 100 may classify the base 3D model 910 and the target 3D model 915 into a plurality of components 920b and 925b. Alternatively, the electronic device 100 may obtain a 3D model classified into the plurality of components 920b and 925b.

The feature extraction units 930 and 935 may output features 940b of each component of the base 3D model and features 945b of each component of the target 3D model by inputting the plurality of components 920a of the base 3D model 910 and the plurality of components 925a of the target 3D model 915. However, components which are not deformed by the electronic device 100 may not be input to the feature extraction units 930 and 935.

According to an embodiment of the disclosure, the component comparison unit 950 may compare a feature (for example, Part $S_a$ or Part $S_b$) of a component of the base 3D model 910, which is to be deformed, with a feature (for example, Part $T_a$ or Part $T_b$) of a component of the target 3D model 915, which is to be deformed. For example, in the case of FIG. 9B, when the base 3D model 910 and the target 3D model 915 each have three components, a total of four component comparisons may be performed, excluding one component for each chair.

An effect of reducing the amount of computation may be obtained by performing feature extraction and component comparison only on a component to be deformed by the electronic device 100. When a previously generated synthesized 3D model and an object image have a high similarity with respect to a specific component, the electronic device 100 may determine not to perform deformation on the corresponding component. The electronic device 100 may generate a 3D model of an object by first compensating for a component having a low similarity.

Figure 10:
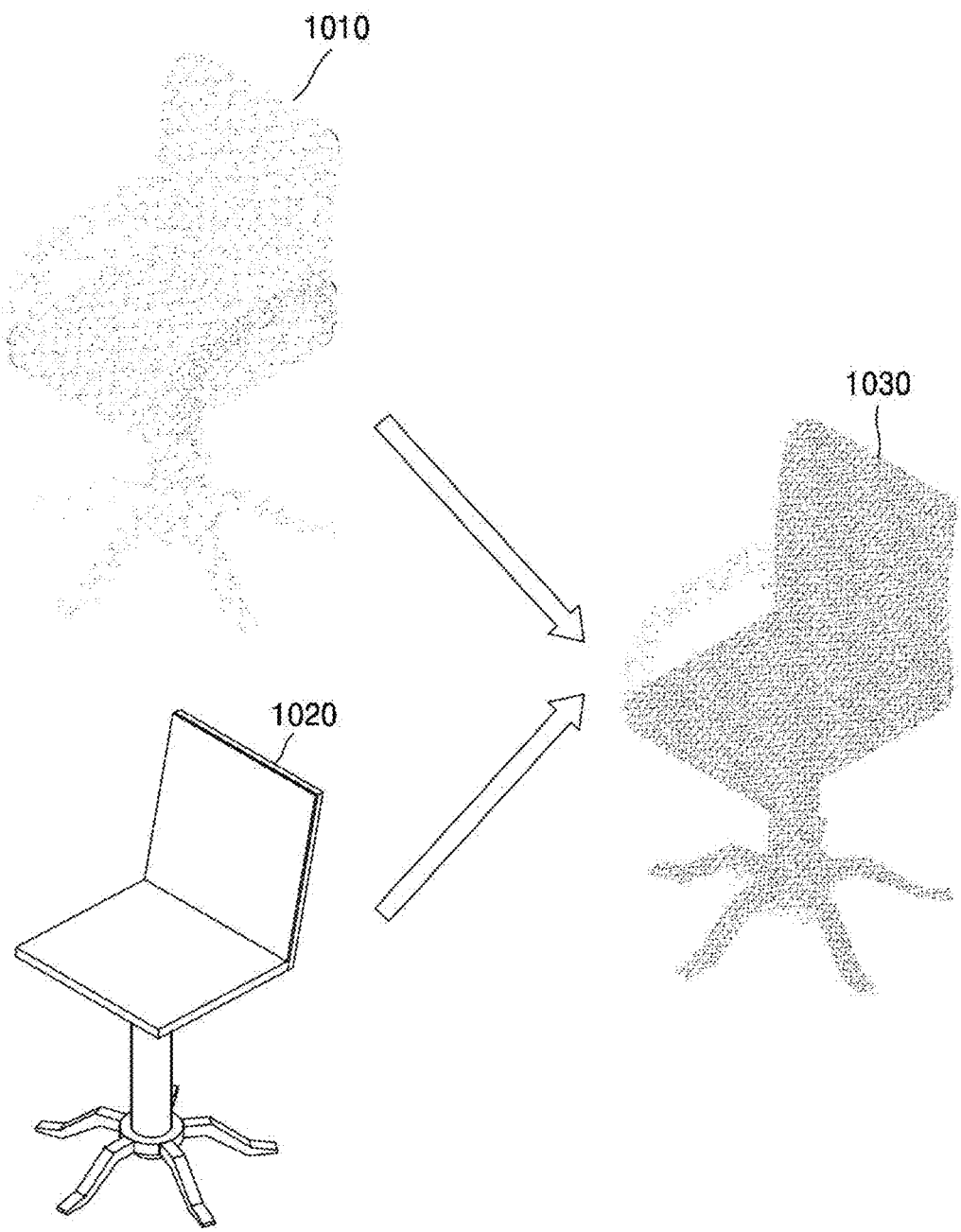
FIG. 10 is a view illustrating a process of merging a plurality of 3D models according to an embodiment of the disclosure.

FIG. 10 is a view illustrating a process of merging a plurality of 3D models according to an embodiment of the disclosure.

Referring to FIG. 10, a synthesized 3D model 1030 may be generated by merging a base 3D model 1010 and a target 3D model 1020. Although FIG. 10 is described based on the base 3D model 1010, the synthesized 3D model 1030 may be generated based on a previously generated synthesized 3D model instead of the base 3D model 1010.

According to an embodiment of the disclosure, the electronic device 100 may merge the base 3D model 1010 and the target 3D model 1020. The synthesized 3D model 1030 may be generated by combining information of the base 3D model 1010 with information of the target 3D model 1020. For example, when a set of points included in the base 3D model 1010 is referred to as A and a set of points included in the target 3D model 1020 is referred to as B, a set of points of the synthesized 3D model 1030 may be determined as A union B.

According to an embodiment of the disclosure, the target 3D model 1020 may have been deformed. The electronic device 100 may perform deformation to change the target 3D model 1020 to correspond to the base 3D model 1010. The amount of information of the deformed first target 3D model 1020 may be equal to the amount of information of the base 3D model 1010. For example, when the base 3D model 1010 includes 3,000 points, a deformed target 3D model downsampled to select 3,000 points from among more than 3,000 points of the target 3D model may be generated.

Figure 11:
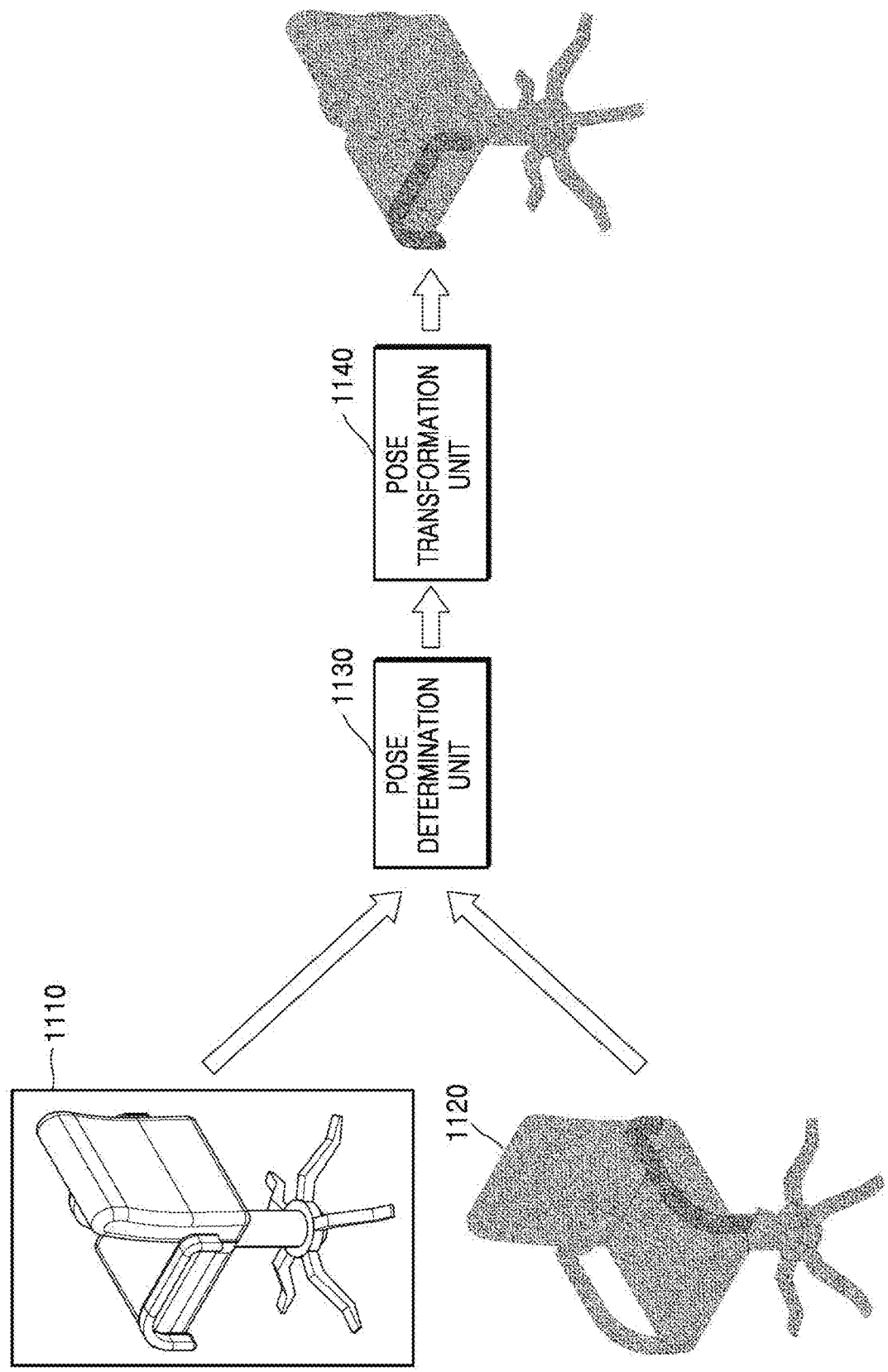
FIG. 11 is a view illustrating a process of comparing an object image with a synthesized 3D model according to an embodiment of the disclosure.

FIG. 11 is a view illustrating a process of comparing an object image with a synthesized 3D model according to an embodiment of the disclosure.

Referring to FIG. 11, the pose of a synthesized 3D model 1120 may be transformed to correspond to the pose of an object image 1110. Throughout the disclosure, the term "pose" may refer to a direction in which an object exists in an image. For example, the object image 1110 shows a left armrest in the image, whereas the synthesized 3D model 1120 shows a left armrest and a right armrest, and thus, the poses of the object image 1110 and the synthesized 3D model 1120 are different from each other.

The electronic device 100 according to an embodiment of the disclosure may include a pose determination unit 1130 and a pose transformation unit 1140. The pose determination unit 1130 may determine the pose of an object image by using, as inputs, the object image 1110 and a synthesized 3D image. According to an embodiment of the disclosure, the pose determination unit 1130 may obtain the pose of an image by using the object image 1110. For example, the pose determination unit 1130 may obtain a 3D vector for the pose of an object. According to an embodiment of the disclosure, the pose determination unit 1130 may obtain a difference in pose by using the object image 1110 and the synthesized 3D model 1120. For example, the pose determination unit 1130 may obtain a 3D vector for performing transformation such that the poses of the object image 1110 and the synthesized 3D model 1120 are the same.

The pose transformation unit 1140 according to an embodiment of the disclosure may transform the pose of the synthesized 3D model 1120 to be the same as the pose of the object image 1110. Whether the synthesized 3D model 1120 and the object image 1110 are similar to each other may be clearly determined by comparing the synthesized 3D model 1120 transformed to have the same pose with the object image 1110.

The electronic device 100 according to an embodiment of the disclosure may determine the similarity between the synthesized 3D model 1120 and the object image 1110. The electronic device 100 may render the synthesized 3D model 1120 having the transformed pose. The electronic device 100 may determine the similarity by comparing the rendered synthesized 3D model 1120 with the object image 1110. For example, the electronic device 100 may determine the similarity based on a difference between the rendered synthesized 3D model 1120 and the object image 1110. Alternatively or additionally, the electronic device 100 may determine the similarity based on a feature of the rendered synthesized 3D model 1120 and a feature of the object image 1110. For example, the electronic device 100 may extract features from the rendered synthesized 3D model 1120 and the object image 1110 and determine the similarity by comparing the extracted features.

FIG. 11 describes a method of transforming a pose based on the synthesized 3D model 1120 which is not rendered, but the disclosure is not limited thereto, and pose transformation may be performed by using a rendered synthesized 3D model.

Figure 12:
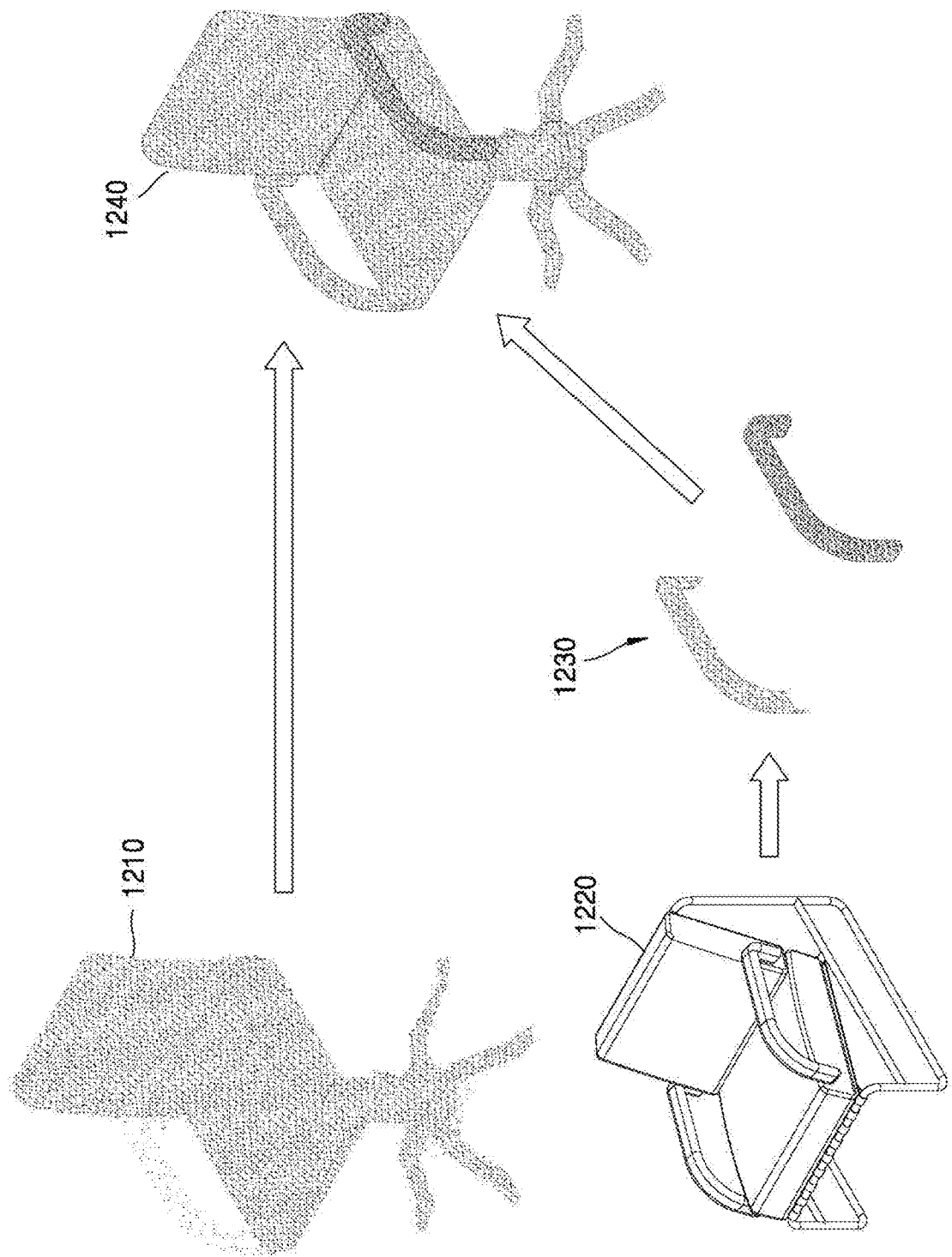
FIG. 12 is a view illustrating a process of compensating for a component having a low similarity according to an embodiment of the disclosure.

FIG. 12 is a view illustrating a process of compensating for a component having a low similarity according to an embodiment of the disclosure.

Referring to FIG. 12, information about armrests of a synthesized 3D model 1210 previously generated is insufficient, and thus, a difference between the synthesized 3D model 1210 and an object image may be large.

The electronic device 100 according to an embodiment of the disclosure may determine a target 3D model 1220 to supplement the information about the armrests of the previously generated synthesized 3D model 1210. The electronic device 100 may determine the target 3D model 1220 based on similarity determination for a component to be compensated for. For example, a 3D model having the highest similarity with respect to an armrest component may be determined as the target 3D model. There may be a more similar 3D model according to the similarity between 3D models including all configurations, but by determining the similarity only with respect to a specific component, information about the corresponding component may be supplemented.

The electronic device 100 may separate a 3D model 1230 corresponding to armrests of the target 3D model 1220. The electronic device 100 may generate a synthesized 3D model 1240 by using the previously generated synthesized 3D model 1210 and the 3D model 1230 corresponding to the armrests.

Figure 13:
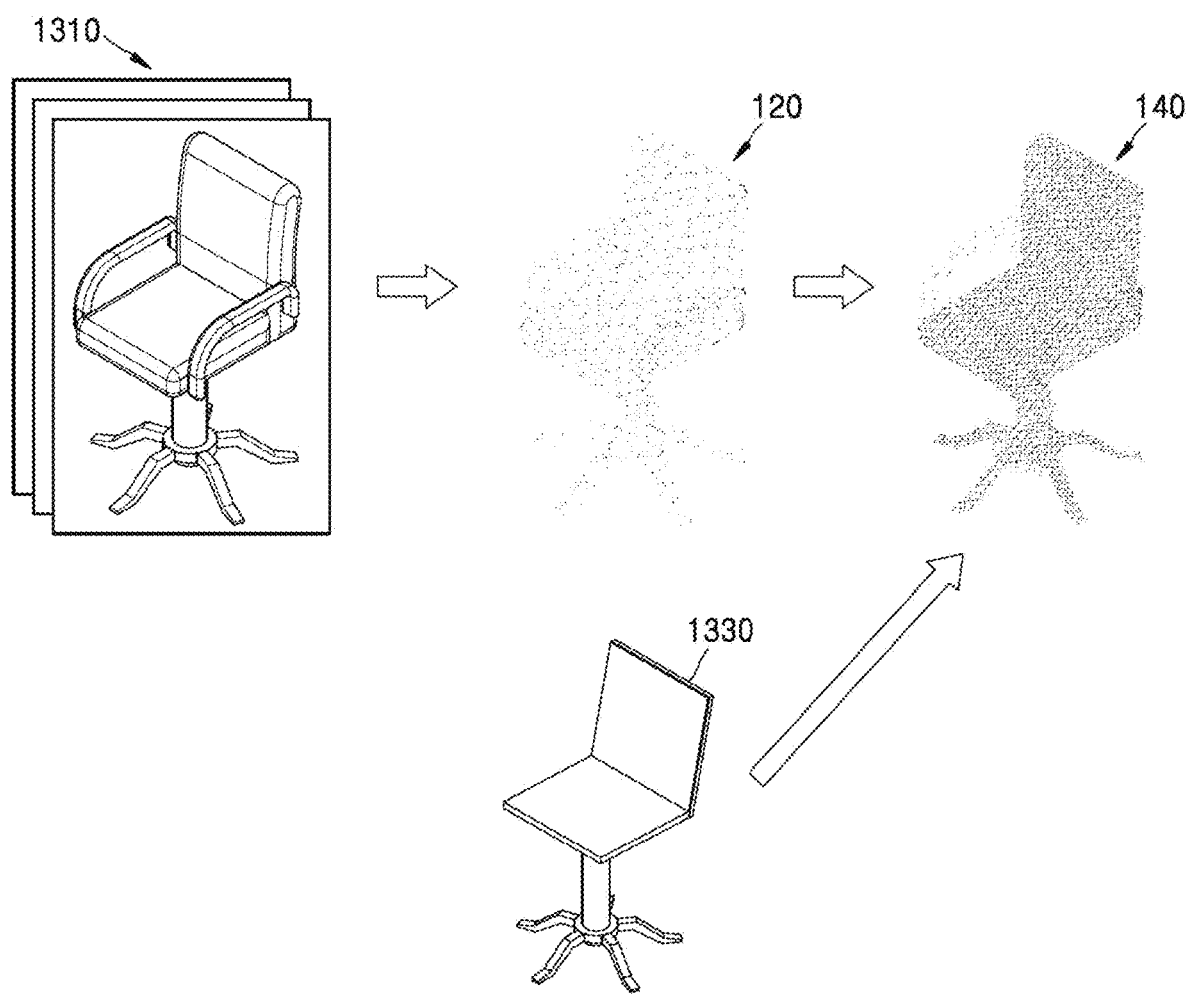
FIG. 13 is a view illustrating color information of a 3D model according to an embodiment of the disclosure.

FIG. 13 is a view illustrating color information of a 3D model according to an embodiment of the disclosure.

Referring to FIG. 13, an object image 1310 is an image including color information. For example, the object image 1310 may be an RGB-D image. Points of a base 3D model 1320 may be determined by using 3D location information of the object image 1310, and color information corresponding to each point may be obtained from the object image 1310. A target 3D model 1330 may include location information.

The electronic device 100 according to an embodiment of the disclosure may generate information about the location of a synthesized 3D model 1340, based on information about the location of the base 3D model 1320 and information about the location of the target 3D model 1330, and may generate information about the color of the synthesized 3D model 1340, based on information about the color of the base 3D model 1320. Information about the location of a 3D model may refer to location information of a point of the 3D model, and information about the color of a 3D model may refer to color information of a point of the 3D model.

The synthesized 3D model 1340 may include points of the base 3D model 1320 and points of the target 3D model 1330. The points of the target 3D model 1330 in the synthesized 3D model 1340 may be determined from color information of the points of the base 3D model 1320. For example, the points of the target 3D model 1330 in the synthesized 3D model 1340 may be generated through interpolation based on location information and color information of the points of the base 3D model 1320. The electronic device 100 may generate a 3D model similar to the object image 1310 by determining color information of the synthesized 3D model 1340 from the base 3D model 1320.

FIG. 13 is described based on a case in which the synthesized 3D model 1340 is generated using the base 3D model 1320, but the disclosure is not limited thereto. A case in which a second synthesized 3D model is generated using a first synthesized 3D model may be equally understood. In other words, location information and color information of a new synthesized 3D model may be determined by using location information and color information of a previously generated synthesized 3D model and location information of a target 3D model.

Figure 14:
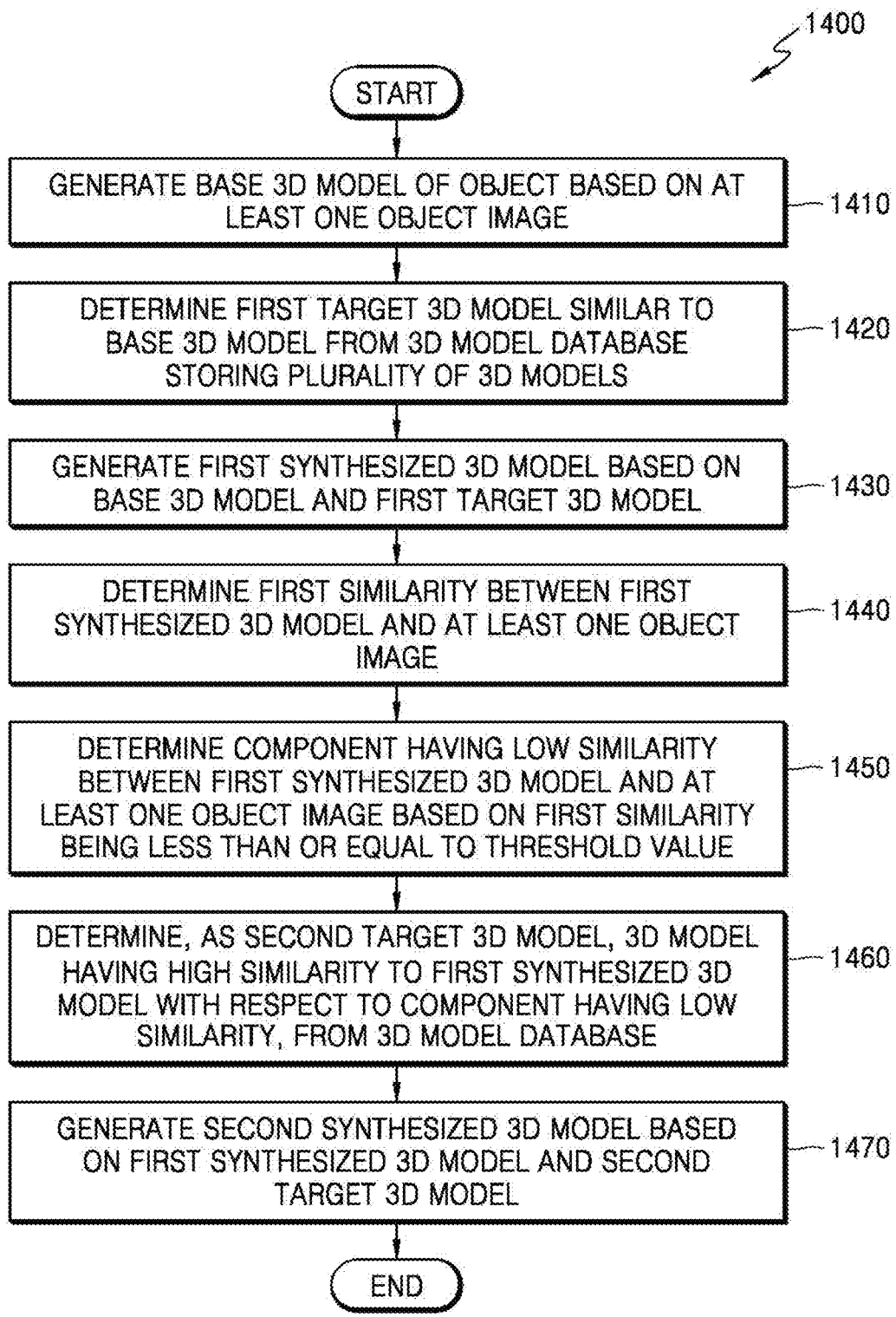
FIG. 14 is a flowchart of a method of generating a synthesized 3D model according to an embodiment of the disclosure.

FIG. 14 is a flowchart of a method of generating a synthesized 3D model according to an embodiment of the disclosure.

Referring to FIG. 14, a method 1400 of generating a synthesized 3D model may start from operation 1410. The method 1400 of generating the synthesized 3D model according to an embodiment of the disclosure may be performed by the electronic device 100.

In operation 1410, the electronic device 100 may generate a base 3D model of an object based on at least one object image. The base 3D model may include 3D information inferred based on the at least one object image. The 3D information may include location information of points representing a boundary of the object.

In operation 1420, the electronic device 100 may determine a first target 3D model similar to the base 3D model from a 3D model database storing a plurality of 3D models. According to an embodiment of the disclosure, the electronic device 100 may identify the type of the object based on the at least one object image, and the 3D model database may be a 3D model database about the identified type of the object. For example, when the electronic device 100 identifies the object as a chair, the 3D model database may be a database about a chair 3D model.

In operation 1430, the electronic device 100 may generate a first synthesized 3D model based on the base 3D model and the first target 3D model. The first synthesized 3D model may be generated by merging the base 3D model and the first target model.

In operation 1440, the electronic device 100 may determine a first similarity between the first synthesized 3D model and the at least one object image. The electronic device 100 may determine the first similarity by comparing the rendered first synthesized 3D model with the at least one object image. For example, the first similarity may be determined as a value between 0 and 1.

In operation 1450, the electronic device 100 may determine a component having a low similarity between the first synthesized 3D model and the at least one object image based on the first similarity being less than or equal to a threshold value. The electronic device 100 may classify a synthesized 3D model into a plurality of components and determine the similarity for each component. According to an embodiment of the disclosure, the electronic device 100 may determine a component having a low third similarity between the first synthesized 3D model and the at least one object image with respect to each of the plurality of classified components, and may determine, as the component having the low similarity, a component having the third similarity less than a certain value among the plurality of components. For example, the electronic device 100 may determine the similarity between the first synthesized 3D model and the at least one object image with respect to a plurality of components, such as "armrests" and "backrest" of the object "chair", and may determine a component having a low similarity by comparing the similarities of each of the plurality of components (for example, the similarity of the "armrests" and the similarity of the "backrest") with a threshold value. At least one component having a low similarity may be determined.

In operation 1460, the electronic device 100 may determine, as a second target 3D model, a 3D model having a high similarity to the first synthesized 3D model with respect to the component having the low similarity, from the 3D model database.

In operation 1470, the electronic device 100 may generate a second synthesized 3D model based on the first synthesized 3D model and the second target 3D mode. The electronic device 100 may classify a synthesized 3D model into a plurality of components and compensate for a component having a low similarity to an object image due to lack of information. The electronic device 100 may compensate for each component by using the 3D model database, and thus may generate a 3D model by using a small number of object images.

Figure 15:
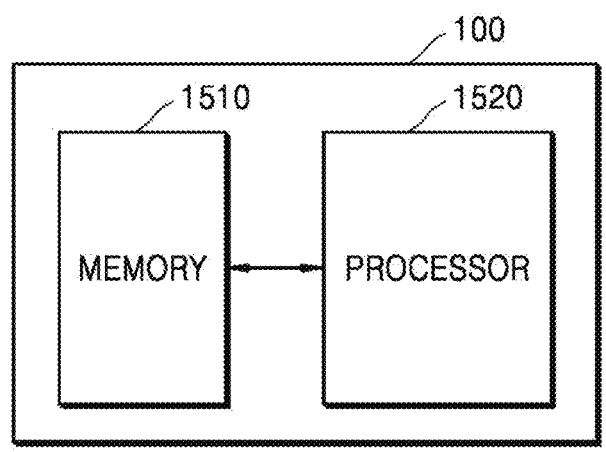
FIG. 15 is a block diagram illustrating components of an electronic device according to an embodiment of the disclosure.

FIG. 15 is a block diagram illustrating components of an electronic device according to an embodiment of the disclosure.

Referring to FIG. 15, the electronic device 100 according to an embodiment of the disclosure may include a memory 1510 and a processor 1520, but is not limited thereto, and may further include general-purpose components.

The memory 1510 according to an embodiment may store a program for processing and control of the processor 1520 and may store data which is input to the electronic device 100 or output from the electronic device 100. The memory 1510 may store instructions, data structures, and program codes readable by the processor 1520. In an embodiment of the disclosure, operations performed by the processor 1520 may be implemented by executing instructions or codes of a program, which are stored in the memory 1510.

The memory 1510 according to an embodiment may include a flash memory type, a hard disk type, a multimedia card micro type, and card type memory (for example, secure digital (SD) or extreme digital (XD) memory), and may include a non-volatile memory including at least one of a read-only memory (ROM), an electrically erasable programmable ROM (EEPROM), a programmable ROM (PROM), a magnetic memory, a magnetic disk, and an optical disk, and a volatile memory, such as a random access memory (RAM) or a static random access memory (SRAM).

The memory 1510 according to an embodiment may store at least one instruction and/or program for controlling the electronic device 100, which generates a 3D model, to perform a task. For example, the memory 1510 may store a base 3D model generation unit, a target 3D model determination unit, a synthesized 3D model generation unit, an image rendering unit, an image comparison unit, a similarity determination unit, a composition comparison unit, a pose determination unit, a pose transformation unit, or the like.

The processor 1520 according to an embodiment may execute instructions stored in the memory 1510 or a programmed software module to control an operation or function of the electronic device 100 to perform a task. The processor 1520 may include a hardware component for performing arithmetic, logic, and input/output operations and signal processing. The processor 1520 may execute the at least one instruction stored in the memory 1510 to control overall operations of the electronic device 100 to perform a task of generating a synthesized 3D.

The processor 1520 according to an embodiment may include at least one of a CPU, a microprocessor, a GPU, application specific integrated circuits (ASICs), DSPs, digital signal processing devices (DSPDs), programmable logic devices (PLDs), field programmable gate arrays (FPGAs), an AP, an NPU, or an AI-dedicated processor designed in a hardware structure specialized for processing AI models, but is not limited thereto. Each processor of the processor 1520 may be a dedicated processor for performing a certain function.

An AI processor according to an embodiment may perform operation and control for processing a task set to be performed by the electronic device 100 by using an AI model. The AI processor may be manufactured in the form of a dedicated hardware chip for AI or may be manufactured as a part of a general-purpose processor (for example, a CPU or an AP) or a dedicated graphics processor (for example, a GPU), and may be mounted in the electronic device 100.

According to an embodiment of the disclosure, the processor 1520 may execute the at least one instruction stored in the memory 1510 to generate a base 3D model of an object based on at least one object image. The processor 1520 may execute the at least one instruction stored in the memory 1510 to determine a first target 3D model similar to the base 3D model from a 3D model database storing a plurality of 3D models. The processor 1520 may execute the at least one instruction stored in the memory 1510 to generate a first synthesized 3D model based on the base 3D model and the first target 3D model. The processor 1520 may execute the at least one instruction stored in the memory 1510 to determine a first similarity between the first synthesized 3D model and the at least one object image. The processor 1520 may execute the at least one instruction stored in the memory 1510 to determine a component having a low similarity between the first synthesized 3D model and the at least one object image based on the first similarity being less than or equal to a threshold value. The processor 1520 may determine, as a second target 3D model, a 3D model having a high similarity to the first synthesized 3D model with respect to the component having the low similarity, from the 3D model database. The processor 1520 may execute the at least one instruction stored in the memory 1510 to generate a second synthesized 3D model based on the first synthesized 3D model and the second target 3D model.

According to an embodiment of the disclosure, the processor 1520 may execute the at least one instruction stored in the memory 1510 to obtain depth information of the at least one object image by using the at least one object image. At least one processor may execute the at least one instruction to generate the base 3D model including 3D location information about at least a portion of the object by using the at least one object image and the obtained depth information.

According to an embodiment of the disclosure, the processor 1520 may execute the at least one instruction stored in the memory 1510 to determine a second similarity between the at least one object image and the plurality of 3D models. The processor 1520 may execute the at least one instruction stored in the memory 1510 to determine, as the first target 3D model, a 3D model having a high second similarity among the plurality of 3D models.

According to an embodiment of the disclosure, the processor 1520 may execute the at least one instruction stored in the memory 1510 to perform deformation on the first target 3D model to correspond to the base 3D model. The processor 1520 may execute the at least one instruction stored in the memory 1510 to merge the base 3D model and the deformed first target 3D model.

According to an embodiment of the disclosure, the processor 1520 may execute the at least one instruction stored in the memory 1510 to classify the base 3D model into a plurality of components of the object.

According to an embodiment of the disclosure, the processor 1520 may execute the at least one instruction stored in the memory 1510 to determine the component having the low similarity between the first synthesized 3D model and the at least one object image with respect to each of the plurality of classified components. The processor 1520 may execute the at least one instruction stored in the memory 1510 to determine, as the component having the low similarity, a component having the third similarity less than a certain value among the plurality of components.

According to an embodiment of the disclosure, the processor 1520 may execute the at least one instruction stored in the memory 1510 to render the first synthesized 3D model. The processor 1520 may execute the at least one instruction stored in the memory 1510 to modify the pose of the rendered first synthesized 3D model to correspond to the at least one object image. The processor 1520 may execute the at least one instruction stored in the memory 1510 to determine the first similarity between the modified rendered first synthesized 3D model and the at least one object image.

According to an embodiment of the disclosure, the processor 1520 may execute the at least one instruction stored in the memory 1510 to identify the type of the object based on the at least one object image. The processor 1520 may execute the at least one instruction stored in the memory 1510 such that the 3D model database may include 3D models related to the type of the object.

According to an embodiment of the disclosure, the processor 1520 may execute the at least one instruction stored in the memory 1510 to generate information about the location of the first synthesized 3D model based on information about the location of the base 3D model and information about the location of the first target 3D model. The processor 1520 may execute the at least one instruction stored in the memory 1510 to generate information about the color of the first synthesized 3D model based on information about the color of the base 3D model.

Meanwhile, the embodiments of the disclosure may be implemented in the form of a recording medium including instructions executable by a computer, such as a program module executed by the computer. A computer-readable medium may be any available medium accessible by a computer and may include volatile and non-volatile media and separable and non-separable media. In addition, examples of the computer-readable medium may include a computer storage medium and a communication medium. Examples of the computer storage medium include all volatile and non-volatile media and separable and non-separable media, which are implemented by an arbitrary method or technology, for storing information, such as computer-readable instructions, data structures, program modules, or other data. The communication medium may typically include other data in modulated data signals, such as computer-readable instructions, data structures, or program modules.

Figure 16:
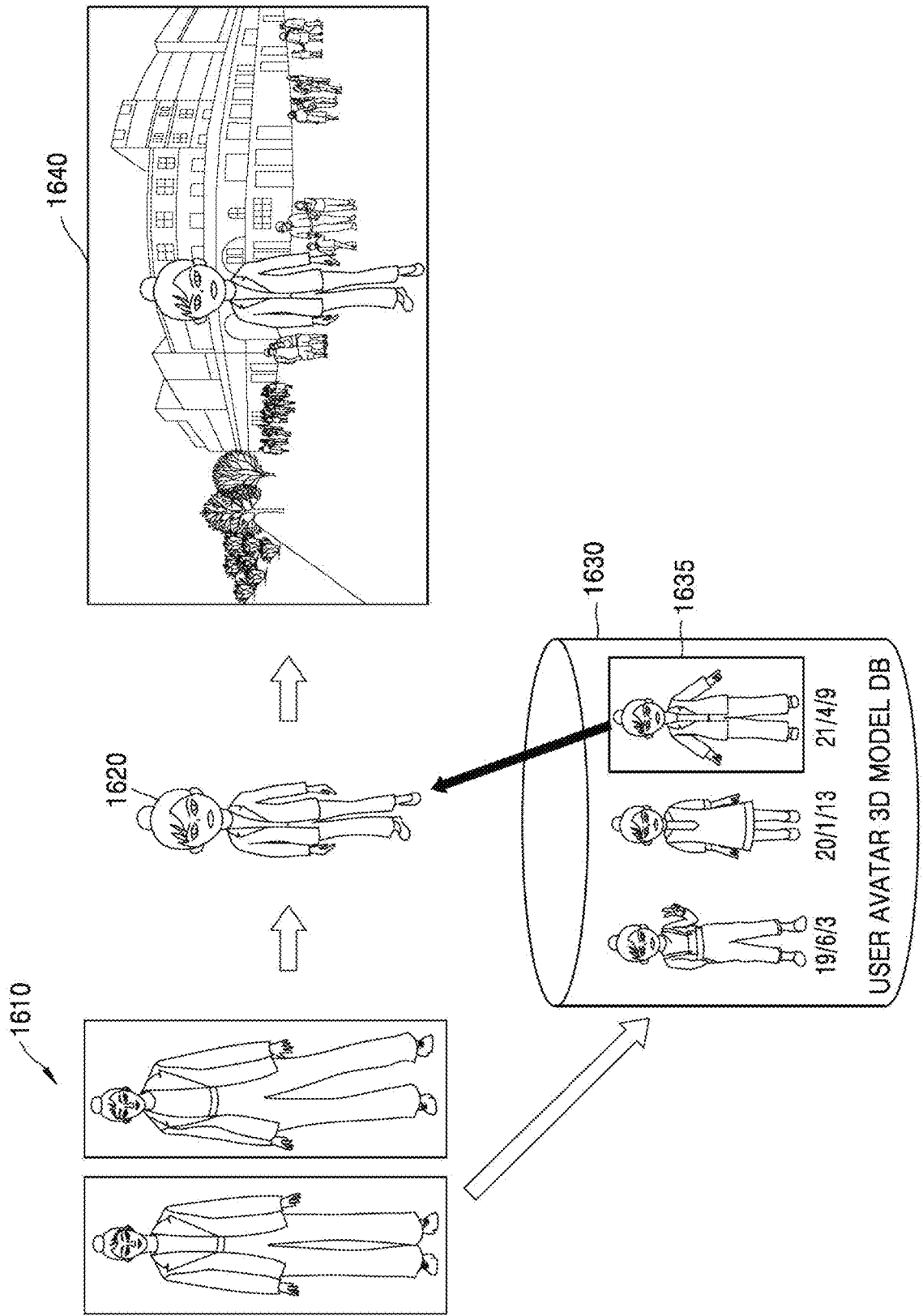
FIG. 16 is a view illustrating a method of generating an avatar 3D model according to an embodiment of the disclosure.

FIG. 16 is a view illustrating a method of generating an avatar 3D model according to an embodiment of the disclosure.

Referring to FIG. 16, a user avatar 3D model DB 1630 includes user avatar 3D models generated in the past. For example, the user avatar 3D model DB 1630 may include a user avatar 3D model generated on Jun. 3, 2019, a user avatar 3D model generated on Jan. 13, 2020, and a user avatar 3D model generated on Apr. 9, 2021. The user avatar 3D model generated on each day may be generated by reflecting a user's outfit on the corresponding day.

The electronic device 100 according to an embodiment of the disclosure may obtain a user image 1610. The electronic device 100 may generate a synthesized avatar 3D model 1620 reflecting the user's outfit based on the user image 1610. The electronic device 100 according to an embodiment of the disclosure may generate a base 3D model based on the user image 1610, and may generate a synthesized avatar 3D model by using a target 3D model 1635 included in the user avatar 3D model DB 1630 and the base 3D model.

The electronic device 100 may generate a synthesized 3D model by repeatedly using a target 3D model in order to compensate for dissimilar components. A method, performed by the electronic device 100, of generating a synthesized 3D model in which some components are compensated for has been described with reference to FIGS. 1 to 8, 9A, 9B, and 10 to 14, and thus, description thereof is omitted. According to an embodiment of the disclosure, components of the synthesized avatar 3D model 1620 may include a user appearance and a user outfit. In addition, more specifically, the user outfit may be classified into top, bottom, and shoes.

The electronic device 100 may utilize the synthesized avatar 3D model 1620 online, such as a metaverse 1640. For example, the electronic device 100 may change a user avatar in the metaverse by using the synthesized avatar 3D model 1620 reflecting the user's outfit.

Figure 17:
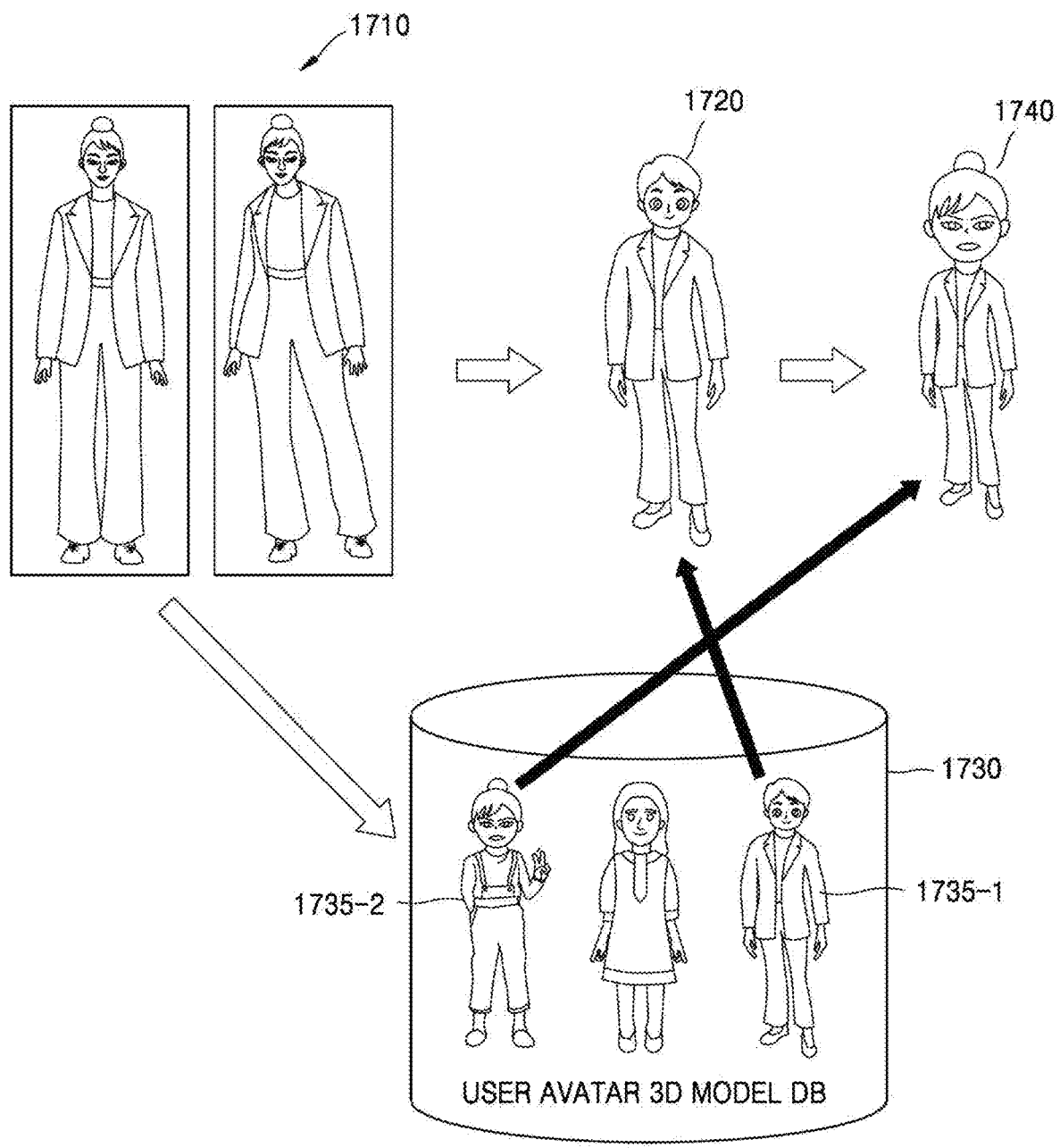
FIG. 17 is a view illustrating a method of generating an avatar 3D model according to an embodiment of the disclosure.

FIG. 17 is a view illustrating a method of generating an avatar 3D model according to an embodiment of the disclosure.

Referring to FIG. 17, a user avatar 3D model DB 1730 includes user avatar 3D models generated in the past. According to an embodiment of the disclosure, the user avatar 3D model DB 1730 may include user avatar 3D models generated by various people.

The electronic device 100 according to an embodiment of the disclosure may obtain a user image 1710. The electronic device 100 may generate a synthesized avatar 3D model 1720 reflecting a user's appearance, based on the user image 1710. The electronic device 100 according to an embodiment of the disclosure may generate a base 3D model based on the user image 1710, and may generate the synthesized avatar 3D model 1720 by using a target 3D model 1735-1 included in the user avatar 3D model DB 1730 and the base 3D model.

The electronic device 100 may generate a new synthesized 3D model 1740 by using a new target 3D model 1735-2 in order to compensate for a dissimilar component. A method, performed by the electronic device 100, of generating a synthesized 3D model in which some components are compensated for has been described with reference to FIGS. 1 to 8, 9A, 9B, and 10 to 14, and thus, description thereof is omitted. According to an embodiment of the disclosure, components of the synthesized avatar 3D model 1720 may include a user appearance and a user outfit. In addition, more specifically, the user appearance may be classified into face, arm, leg, and the like.

The electronic device 100 may utilize the synthesized 3D model 1740 online, such as a metaverse. For example, the electronic device 100 may change a user avatar in the metaverse by using the synthesized 3D model 1740 reflecting the user's outfit.

Figure 18:
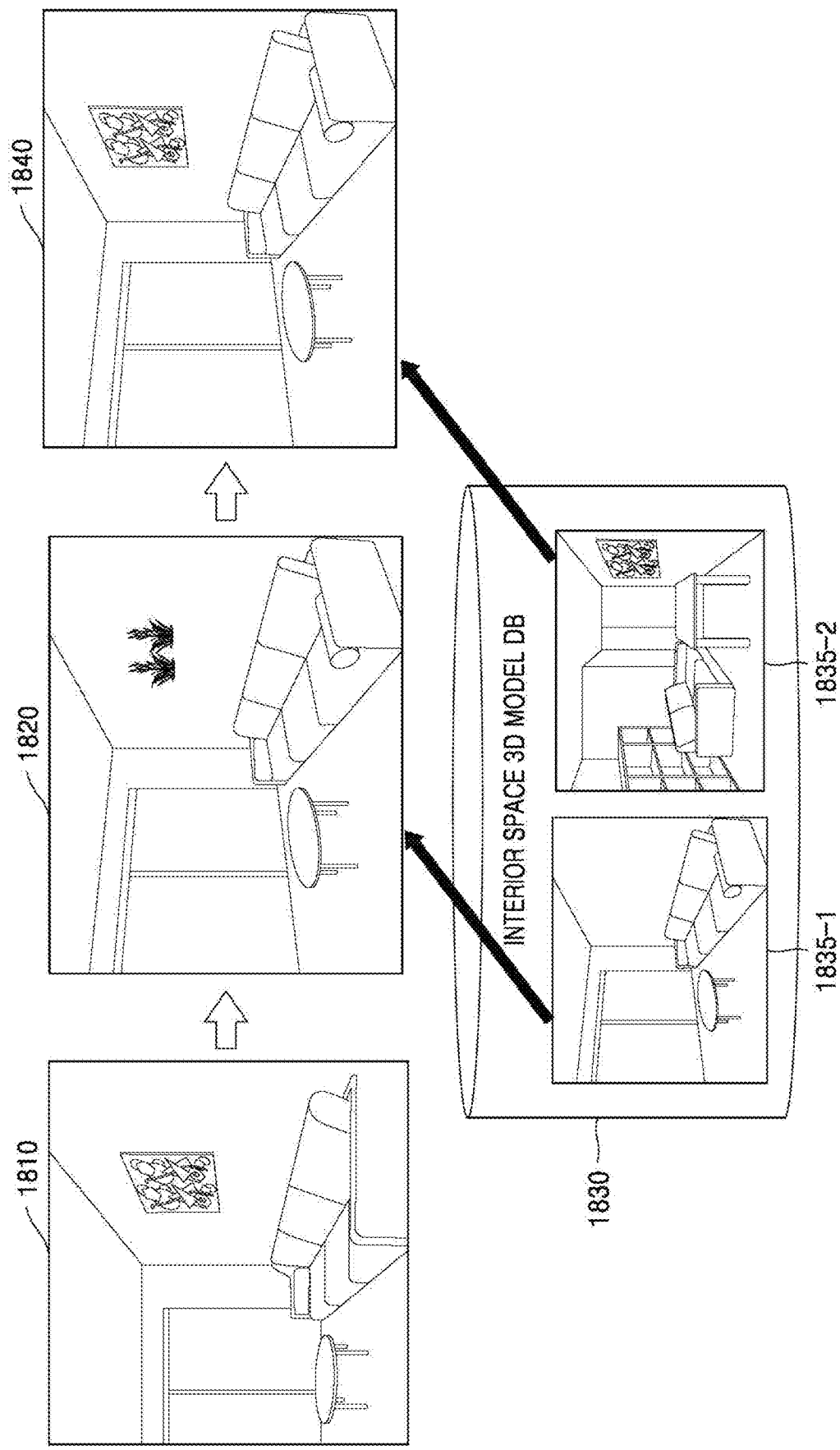
FIG. 18 is a view illustrating a method of generating an interior 3D model according to an embodiment of the disclosure.

FIG. 18 is a view illustrating a method of generating an interior space 3D model according to an embodiment of the disclosure.

Referring to FIG. 18, an interior space 3D model DB 1830 includes interior 3D models generated in the past.

The electronic device 100 according to an embodiment of the disclosure may obtain an interior space image 1810. The electronic device 100 may generate a synthesized interior space 3D model 1820 based on the interior space image 1810. The electronic device 100 according to an embodiment of the disclosure may generate a base interior space 3D model based on the interior space image 1810, and may generate the synthesized interior space 3D model 1820 by using a target interior space 3D model 1835-1 included in an interior space 3D model 1830 and the base interior space 3D model.

The electronic device 100 may generate a new synthesized interior space 3D model 1840 by using a new target interior space 3D model 1835-2 in order to compensate for a dissimilar component. For example, in order to supplement information about a picture frame included in an outer wall, the electronic device 100 may use a target interior space 3D model including a component similar to the picture frame. A method, performed by the electronic device 100, of generating a synthesized 3D model in which some components are compensated for has been described with reference to FIGS. 1 to 8, 9A, 9B, and 10 to 14, and thus, description thereof is omitted.

The electronic device 100 may utilize the synthesized interior space 3D model 1840 in an Internet of things (IoT) device or the like. For example, the electronic device 100 may perform a task, such as recommending furniture arrangement to a user or setting a route for a robot cleaner by using the synthesized interior space 3D model 1840.

Figure 19A:
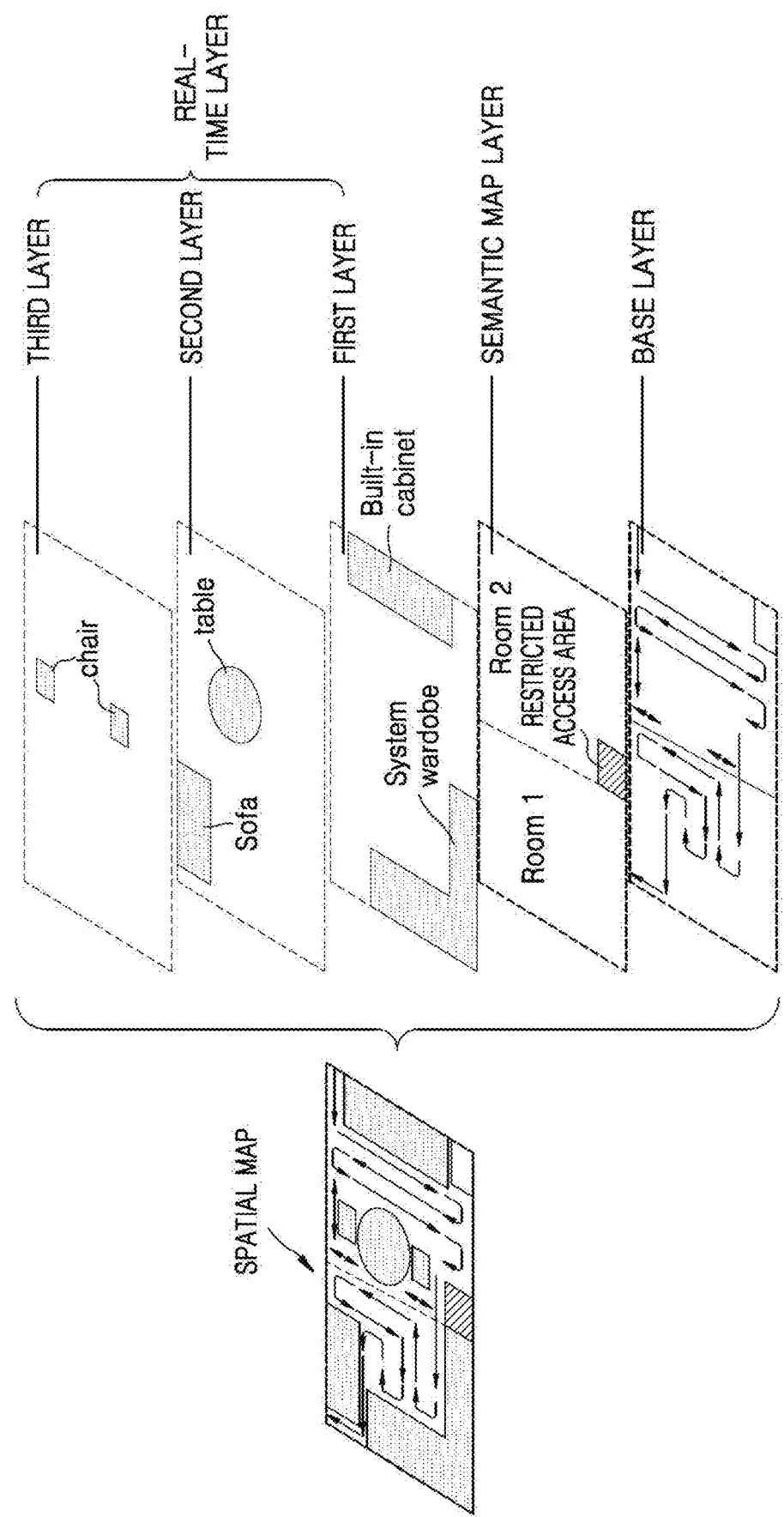
FIG. 19A is a flowchart illustrating a spatial map according to an embodiment of the disclosure.

FIG. 19A is a flowchart illustrating a spatial map according to an embodiments of the disclosure.

Referring to FIG. 19A, a spatial map and a hierarchical structure between a plurality of layers of the spatial map are shown. As shown in FIG. 19A, the spatial map may include a base layer, a semantic map layer, and a real-time layer, but the disclosure is not limited thereto, and layers may be added or subtracted according to characteristics of a task.

The base layer provides information about a basic structure of the entire space, such as walls, columns, and passageways. The base layer may provide 3D information of a space, location information of an object, movement trajectory information, or the like, by processing 3D point cloud data, matching coordinate systems, and storing locations. The base layer serves as a base map and a geometric map.

The semantic map layer is a layer which provides semantic information above the base layer. A user may apply semantic information, such as "Room 1", "Room 2", and "restricted access area" to the basic structure of the entire space of the base layer so as to be utilized by an electronic device for performing a task. For example, when the electronic device is a robot cleaner, the user may set semantic information in the semantic map layer such that only "Room 2" is cleaned or the robot cleaner does not clean the "restricted access area".

The real-time layer is a layer which provides information about at least one object in a space. Objects may include both a static object and a dynamic object. Throughout the disclosure, the real-time layer may include a plurality of layers based on attribute information of an object and may have a hierarchical structure between the layers. As shown in FIG. 19A, the real-time layer may include a first layer, a second layer, and a third layer, but the disclosure is not limited thereto, and the number of layers may be increased or decreased according to classification criteria of attribute information of an object. Referring to FIG. 19A, the first layer includes a system wardrobe and a built-in cabinet, the second layer includes a table and a sofa, and the third layer includes a chair.

Figure 19B:
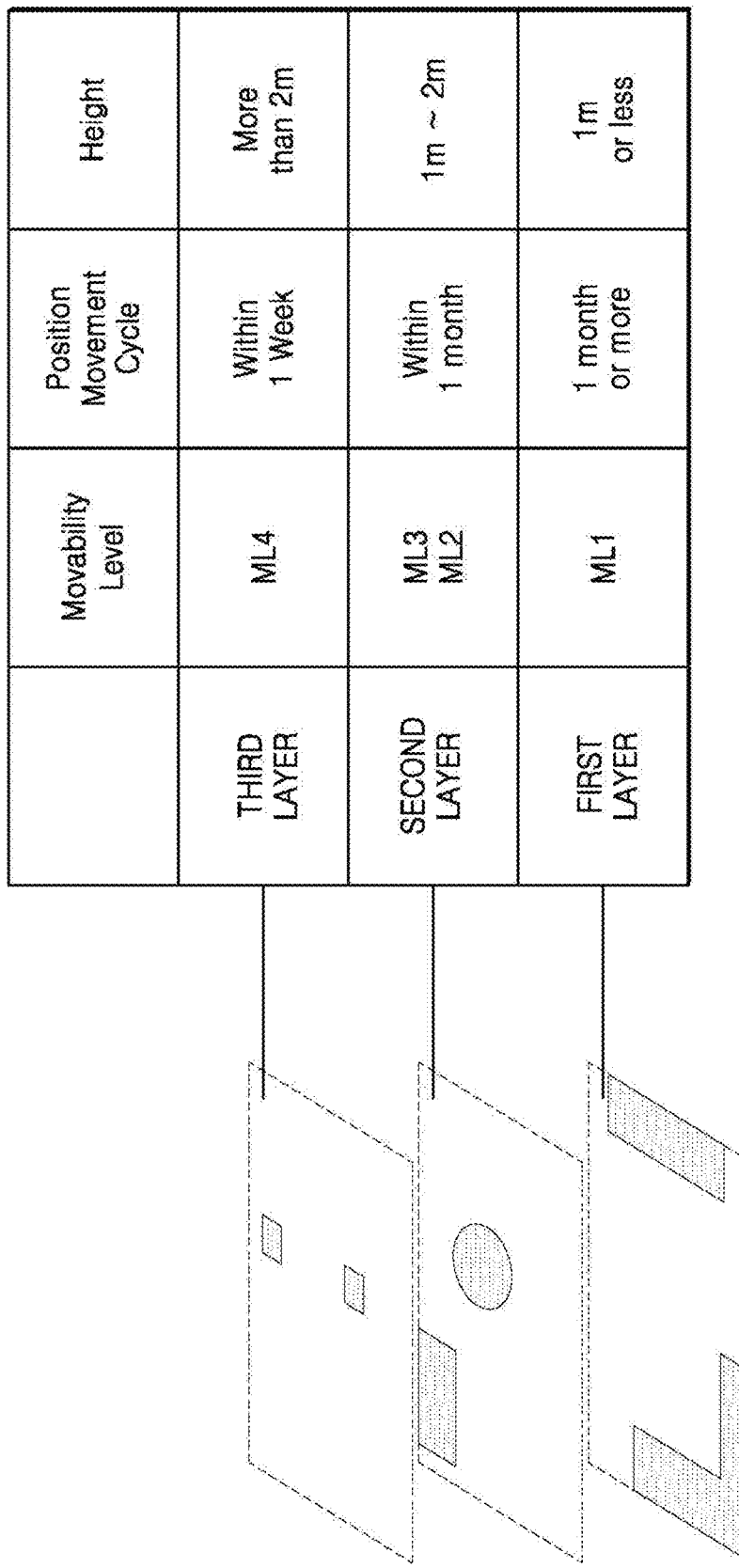
FIG. 19B is a flowchart illustrating a spatial map according to an embodiment of the disclosure.

FIG. 19B is a flowchart illustrating a spatial map according to an embodiments of the disclosure.

Referring to FIG. 19B, various examples of the real-time layer including a plurality of layers based on attribute information of an object are shown.

Attribute information of an object may be information which may be classified by combining objective criteria, such as the type, shape, size, height, and the like of the object or a plurality of criteria. In addition, the attribute information of the object may vary depending on a user and an environment, and thus, the attribute information may be input by labeling for each object.

According to an embodiment of the disclosure, when the attribute information of the object is a movability level (ML) of the object, the first layer may include an object corresponding to ML1, the second layer may include an object corresponding to ML2 and ML3, and the third layer may include an object corresponding to ML4. The movability level of the object may be determined by applying the object's objective characteristics to a certain classification criterion for evaluating movability. For example, ML1 corresponds to an object which is not movable, ML2 corresponds to an object which is movable, but mostly remain stationary, ML3 corresponds to an object which is movable and occasionally moves, and ML4 corresponds to an object which is movable and frequently moves.

According to an embodiment of the disclosure, when the attribute information of the object is a position movement cycle of the object, the first layer may include an object which has not moved within one month, the second layer may include an object which has moved within one month, and the third layer may include an object which has moved within one week. Unlike the movability level classified based on the object's objective characteristics, the position movement cycle may vary even for the same object according to a user who uses the object or an environment in which the object is located. For example, an object "A" may be an object frequently used by a first user, but may be an object rarely used by a second user. An object "B" may be an object frequently used in a first place, but may be an object rarely used in a second place.

According to an embodiment of the disclosure, when the attribute information of the object is a height at which the object is located, the first layer may include an object located at a height of 1 m or less, the second layer may include an object located at a height of at least 1 m and not more than 2 m, and the third layer may include an object located at a height of more than 2 m.

According to an embodiment of the disclosure, a classification criterion of the plurality of layers included in the real-time layer may be defined by a user. For example, the user may set the classification criterion by combining attribute information of a plurality of types of objects to generate a spatial map reflecting characteristics of a task. For example, robot cleaners generally move below a height of 50 cm, and thus, it is not necessary to consider objects located at a height of more than 1 m, for example, a lamp or a picture frame hanging on a wall. Therefore, a user may directly set a classification criterion for classifying each layer such that the first layer includes an object which is ML1 and is located at a height of 1 m or less, the second layer includes an object which is ML3 and is located at a height of 1 m or less, and the third layer includes an object which is ML4 and is located at a height of 1 m or less.

Figure 20A:
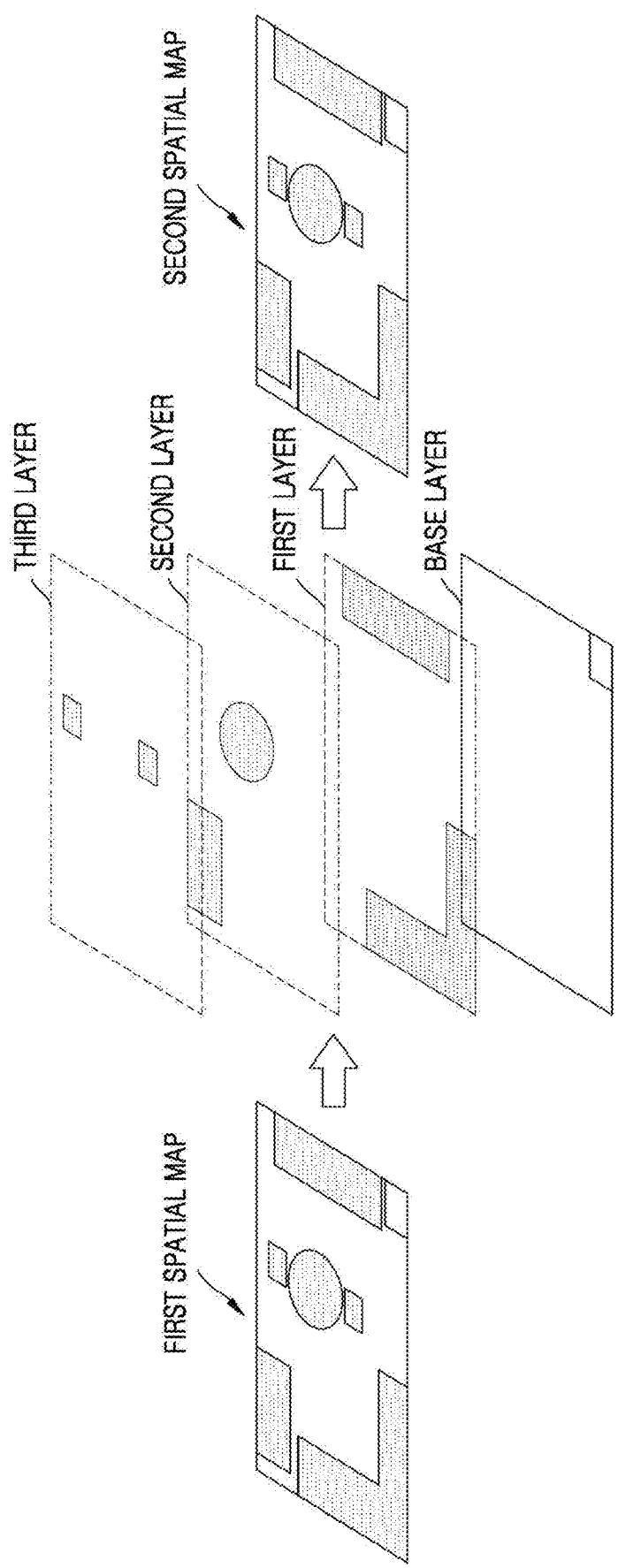
FIG. 20A is a view illustrating a method of utilizing layers of a spatial map according to an embodiment of the disclosure.

FIG. 20A is a view illustrating a method of utilizing layers of a spatial map according to an embodiment of the disclosure.

According to types of electronic devices or IoT devices or characteristics of tasks, spatial maps used in each device may be different from each other. An electronic device may utilize an existing spatial map stored in the electronic device as it is, but when a change occurs in a space where a task is to be performed, the spatial map may be updated to reflect the change. The electronic device may update the existing spatial map by receiving, from at least one external device, a spatial map already reflecting the change which has occurred in the space. The electronic device may generate a new spatial map based on the existing spatial map.

Referring to FIG. 20A, an electronic device may retrieve an existing spatial map (hereinafter, referred to as a first spatial map) which has been stored. The first spatial map may include a base layer, a first layer, a second layer, and a third layer. Hereinafter, for convenience of explanation, descriptions is made assuming that the first layer to the third layer include objects according to any classification criterion of FIG. 19B. When the first spatial map has been generated just a few minutes ago or there has been no change in space since the first spatial map has been used, the electronic device may obtain a new spatial map (hereinafter, referred to as a second spatial map) by utilizing the first spatial map as it is and use the second spatial map to perform a new task.

Figure 20B:
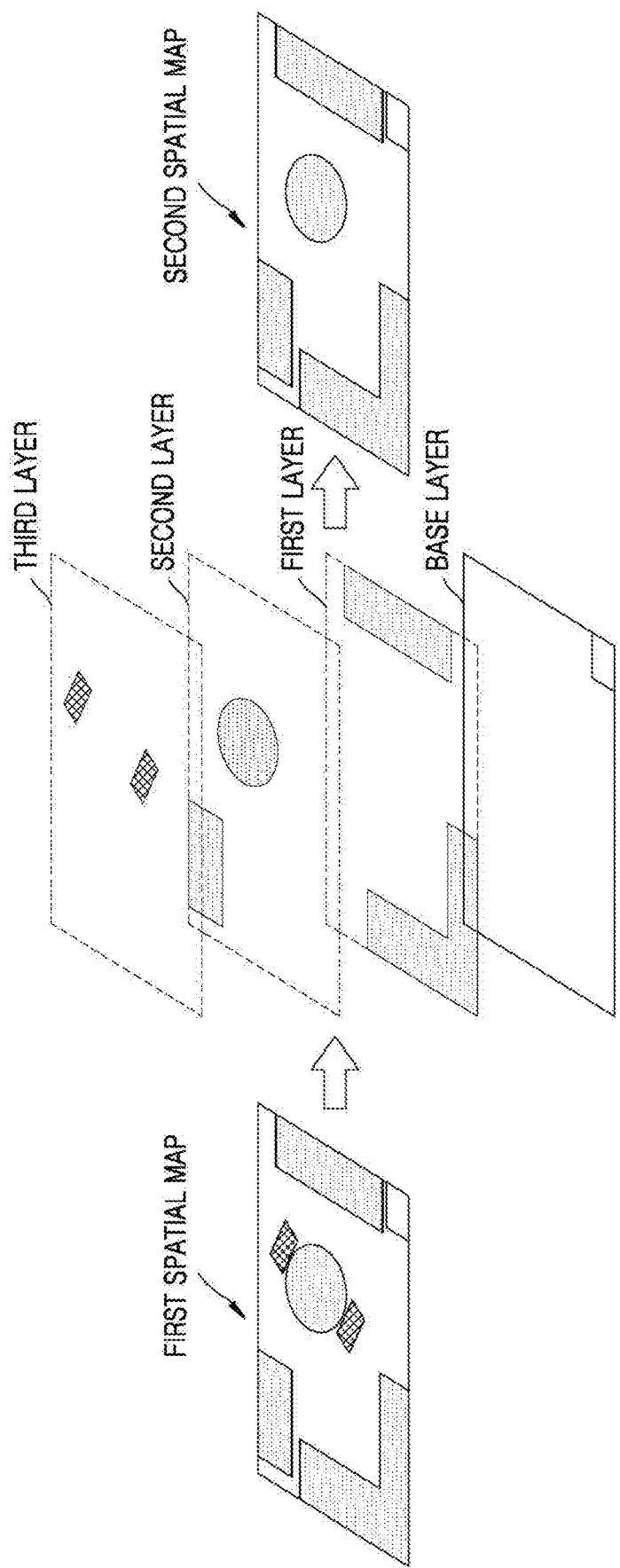
FIG. 20B is a view illustrating a method of utilizing layers of a spatial map according to an embodiment of the disclosure.

FIG. 20B is a view illustrating a method of utilizing layers of a spatial map according to an embodiment of the disclosure.

Referring to FIG. 20B, the electronic device may retrieve the first spatial map which has been stored. In a case where the electronic device performs a task, when object information of ML4 which frequently moves is not necessary or only object information of an object which has not moved for at least one week is used, the second spatial map may be obtained by selecting the base layer, the first layer, and the second layer among the layers of the first spatial map or removing the third layer from the first spatial map.

Figure 20C:
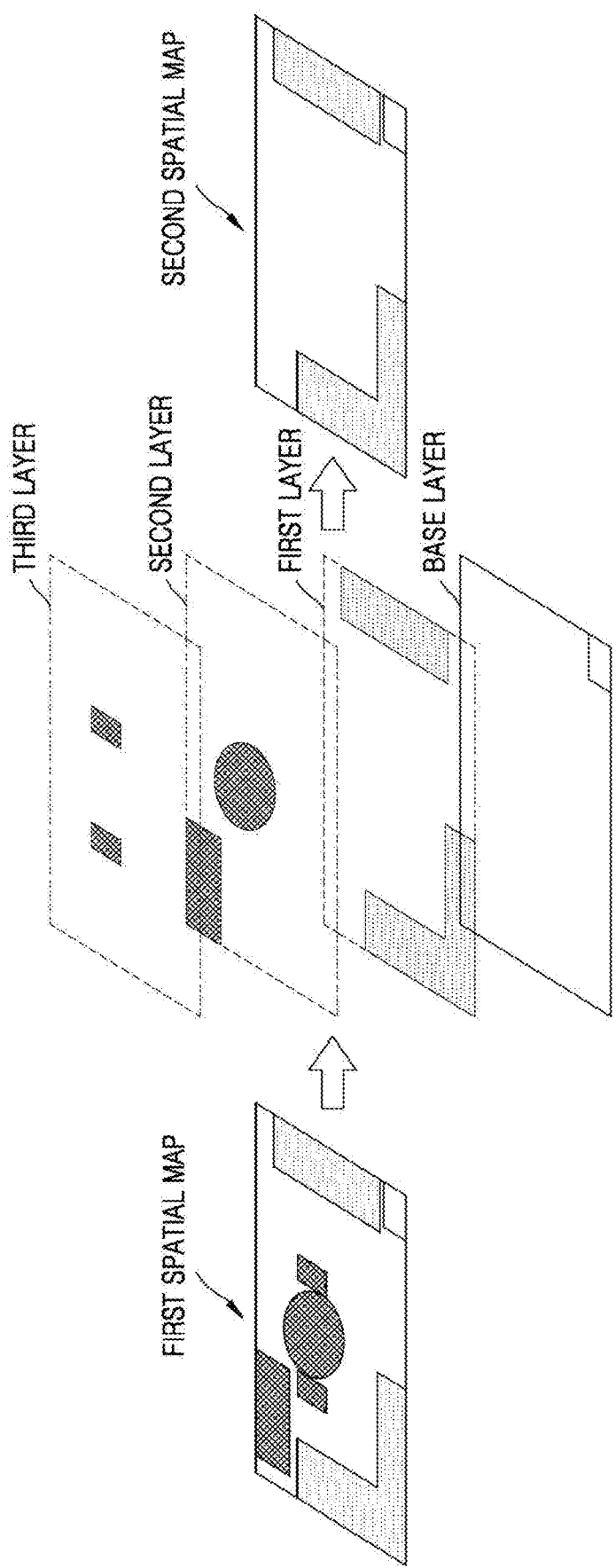
FIG. 20C is a view illustrating a method of utilizing layers of a spatial map according to an embodiment of the disclosure.

FIG. 20C is a view illustrating a method of utilizing layers of a spatial map according to an embodiment of the disclosure.

Referring to FIG. 20C, the electronic device may retrieve the first spatial map which has been stored. In a case where the electronic performs a new task, when only object information of ML1 is necessary or only object information of an object which has not moved for at least one month, the second spatial map may be obtained by selecting the base layer and the first layer among the layers of the first spatial map or removing the second layer and the third layer from the first spatial map.

Figure 20D:
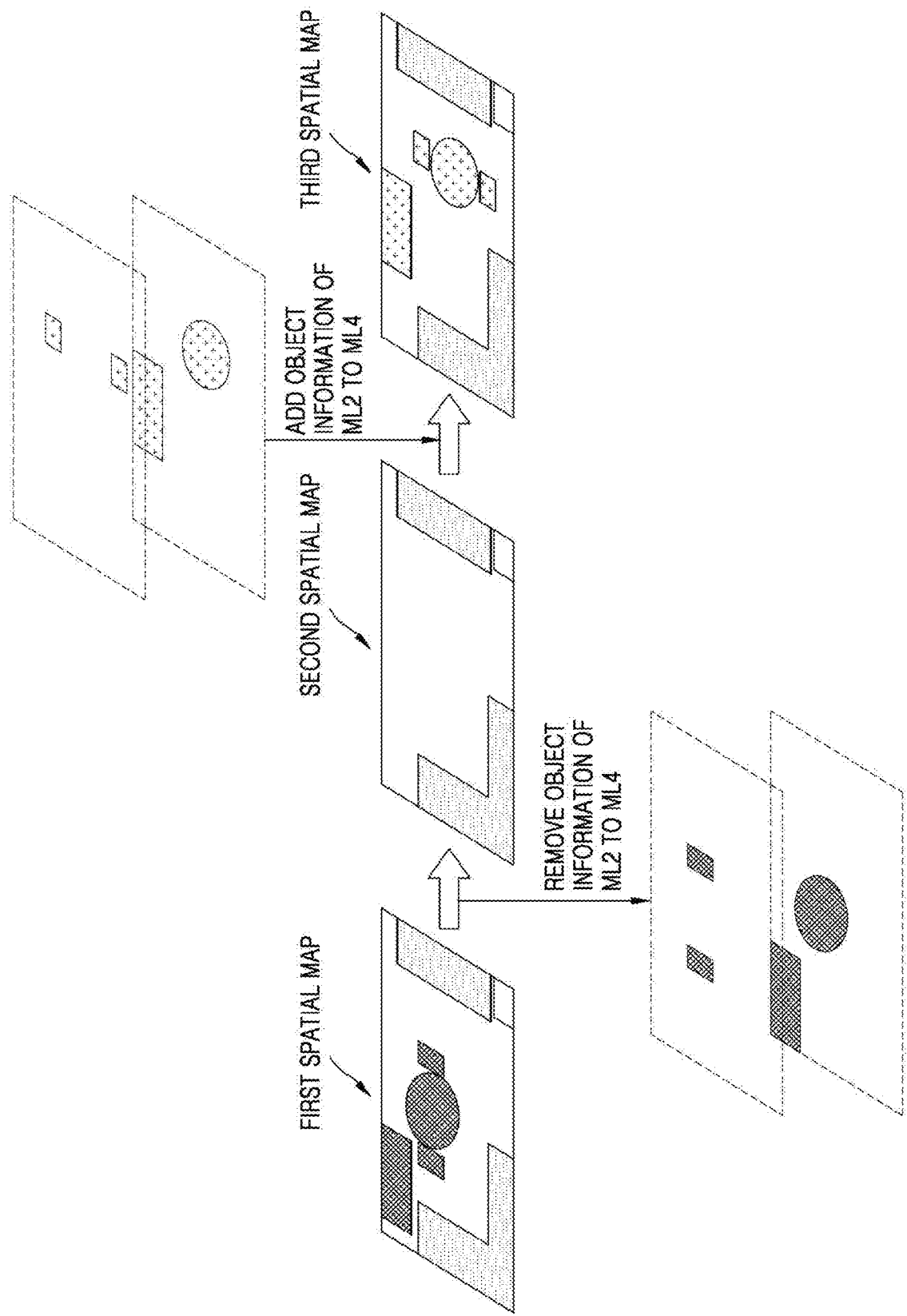
FIG. 20D is a view illustrating a method of utilizing layers of a spatial map according to an embodiment of the disclosure.

FIG. 20D is a view illustrating a method of utilizing layers of a spatial map according to an embodiment of the disclosure.

Referring to FIG. 20D, the electronic device may retrieve the first spatial map which has been stored. In a case where the electronic device performs a new task, when it is necessary to reflect the latest information of objects corresponding to ML2, ML3, and ML4 which are movable, the second spatial map may be obtained by selecting the base layer and the first layer among the layers of the first spatial map or removing the second layer and the third layer from the first spatial map. Hereinafter, the electronic device may obtain a third spatial map by extracting a second layer and a third layer from a spatial map received from an external device and reflecting the second layer and the third layer in the second spatial map. Alternatively, the third spatial map may be obtained by detecting objects corresponding to ML2, ML3, and ML4 by using at least one sensor provided in the electronic device and reflecting the detected objects in the second spatial map.

Device-readable storage media may be provided in the form of non-transitory storage media. Here, the term "non-transitory storage media" is a tangible device and only means that it does not include a signal (e.g., electromagnetic wave), and the term does not distinguish between a case where data is stored semi-permanently in storage media and a case where data is stored temporarily in storage media. For example, the "non-transitory storage media" may include a buffer in which data is temporarily stored.

According to an embodiment of the disclosure, the methods according to the embodiments disclosed herein may be provided while included in a computer program product. The computer program product may be traded as merchandise between a seller and a purchaser. The computer program product may be distributed in the form of a device-readable storage medium (for example, a compact disc ROM (CD-ROM)), or may be distributed (for example, downloaded or uploaded) online through an application store or directly between two user devices (for example, smartphones). In the case of the online distribution, at least a part of the computer program product (for example, downloadable app) may be temporarily stored in a device-readable storage medium, such as a server of a manufacturer, a server of an application store, or a memory of a relay server, or may be temporarily generated.

According to an embodiment of the disclosure, there is provided a method of generating a three-dimensional (3D) model. The method of generating the 3D model may include generating a base 3D model of an object based on at least one object image of the object. The method of generating the 3D model may include determining a first target 3D model similar to the base 3D model from a 3D model database storing a plurality of 3D models. The method of generating the 3D model may include generating a first synthesized 3D model based on the base 3D model and the first target 3D model. The method of generating the 3D model may include determining a first similarity between the first synthesized 3D model and the at least one object image. The method of generating the 3D model may include determining a component having a low similarity between the first synthesized 3D model and the at least one object image based on the first similarity being less than or equal to a threshold value. The method of generating the 3D model may include determining, as a second target 3D model, a 3D model having a high similarity to the first synthesized 3D model with respect to the component having the low similarity, from the 3D model database. The method of generating the 3D model may include generating a second synthesized 3D model based on the first synthesized 3D model and the second target 3D model.

The generating of the base 3D model according to an embodiment of the disclosure may include obtaining depth information of the at least one object image by using the at least one object image. The generating of the base 3D model according to an embodiment of the disclosure may include generating the base 3D model including 3D location information about at least a portion of the object by using the at least one object image and the obtained depth information.

The determining of the first target 3D model according to an embodiment of the disclosure may include determining a second similarity between the at least one object image and the plurality of 3D models. The determining of the first target 3D model may include determining, as the first target 3D model, a 3D model having a high second similarity among the plurality of 3D models.

The generating of the first synthesized 3D model according to an embodiment of the disclosure may include performing deformation on the first target 3D model to correspond to the base 3D model. The generating of the first synthesized 3D model may include merging the base 3D model and the deformed first target 3D model.

The method of generating the 3D model according to an embodiment of the disclosure may further include classifying the base 3D model into a plurality of components of the object.

The determining of the component having the low similarity according to an embodiment of the disclosure may include determining a third similarity between the first synthesized 3D model and the at least one object image with respect to each of the plurality of classified components. The determining of the component having the low similarity may include determining, as the component having the low similarity, a component having the third similarity less than a certain value among the plurality of components.

The determining of the first similarity according to an embodiment of the disclosure may include rendering the first synthesized 3D model. The determining of the first similarity may include modifying the pose of the rendered first synthesized 3D model to correspond to the at least one object image. The determining of the first similarity may include determining the first similarity between the modified rendered first synthesized 3D model and the at least one object image.

The method of generating the 3D model according to an embodiment of the disclosure may further include identifying the type of the object based on the at least one object image. The 3D model database may include 3D models related to the type of the object.

The generating of the first synthesized 3D model according to an embodiment of the disclosure may include generating information about the location of the first synthesized 3D model based on information about the location of the base 3D model and information about the location of the first target 3D model. The generating of the first synthesized 3D model may include generating information about the color of the first synthesized 3D model based on information about the color of the base 3D model.

At least one of the first synthesized 3D model and the second synthesized 3D model according to an embodiment of the disclosure may include at least one of a point cloud model, a polygon mesh model, a triangle mesh model, a non-uniform rational B-spline (NURBS) model, or a sculpting model.

According to an embodiment of the disclosure, there is provided at least one non-transitory computer-readable recording medium storing a program for performing the above-described method.

According to an embodiment of the disclosure, there is provided an electronic device for generating a three-dimensional (3D) model. The electronic device may include at least one processor. The electronic device may include a memory storing at least one instruction. The at least one processor may execute the at least one instruction to generate a base 3D model of an object based on at least one object image. The at least one processor may execute the at least one instruction to determine a first target 3D model similar to the base 3D model from a 3D model database storing a plurality of 3D models. The at least one processor may execute the at least one instruction to generate a first synthesized 3D model based on the base 3D model and the first target 3D model. The at least one processor may execute the at least one instruction to determine a first similarity between the first synthesized 3D model and the at least one object image. The at least one processor may execute the at least one instruction to determine a component having a low similarity between the first synthesized 3D model and the at least one object image based on the first similarity being less than or equal to a threshold value. The at least one processor may execute the at least one instruction to determine, as a second target 3D model, a 3D model having a high similarity to the first synthesized 3D model with respect to the component having the low similarity, from the 3D model database. The at least one processor may execute the at least one instruction to generate a second synthesized 3D model based on the first synthesized 3D model and the second target 3D model.

According to an embodiment of the disclosure, the at least one processor may execute the at least one instruction to obtain depth information of the at least one object image by using the at least one object image. At least one processor may execute the at least one instruction to generate the base 3D model including 3D location information about at least a portion of the object by using the at least one object image and the obtained depth information.

According to an embodiment of the disclosure, the at least one processor may execute the at least one instruction to determine a second similarity between the at least one object image and the plurality of 3D models. The at least one processor may execute the at least one instruction to determine, as the first target 3D model, a 3D model having a high second similarity among the plurality of 3D models.

According to an embodiment of the disclosure, the at least one processor may execute the at least one instruction to perform deformation on the first target 3D model to correspond to the base 3D model. The at least one processor may execute the at least one instruction to merge the base 3D model and the deformed first target 3D model.

According to an embodiment of the disclosure, the at least one processor may execute the at least one instruction to classify the base 3D model into a plurality of components of the object.

According to an embodiment of the disclosure, the at least one processor may execute the at least one instruction to determine a third similarity between the first synthesized 3D model and the at least one object image with respect to each of the plurality of classified components. The at least one processor may execute the at least one instruction to determine, as the component having the low similarity, a component having the third similarity less than a certain value among the plurality of components.

According to an embodiment of the disclosure, the at least one processor may execute the at least one instruction to render the first synthesized 3D model. The at least one processor may execute the at least one instruction to determine the pose of the rendered first synthesized 3D model to correspond to the at least one object image. The at least one processor may execute the at least one instruction to determine the first similarity between the modified rendered first synthesized 3D model and the at least one object image.

According to an embodiment of the disclosure, the at least one processor may execute the at least one instruction to identify the type of the object based on the at least one object image. The at least one processor may execute the at least one instruction such that the 3D model database may include 3D models related to the type of the object.

According to an embodiment of the disclosure, the at least one processor may execute the at least one instruction to generate information about the location of the first synthesized 3D model based on information about the location of the base 3D model and information about the location of the first target 3D model. The at least one processor may execute the at least one instruction to generate information about the color of the first synthesized 3D model based on information about the color of the base 3D model.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of generating a three-dimensional (3D) model, the method comprising:
    generating a base 3D model of an object, based on at least one object image;
    determining a first target 3D model similar to the base 3D model from a 3D model database storing a plurality of 3D models;
    generating a first synthesized 3D model, based on the base 3D model and the first target 3D model;
    determining a first similarity between the first synthesized 3D model and the at least one object image;
    determining a component having a low similarity between the first synthesized 3D model and the at least one object image, based on the first similarity being less than or equal to a threshold value;
    determining, as a second target 3D model, a 3D model having a high similarity to the first synthesized 3D model with respect to the component having the low similarity, from the 3D model database; and
    generating a second synthesized 3D model, based on the first synthesized 3D model and the second target 3D model.

2. The method of claim 1, wherein the generating of the base 3D model comprises:
    obtaining depth information of the at least one object image by using the at least one object image; and
    generating the base 3D model including 3D location information about at least a portion of the object by using the at least one object image and the obtained depth information.

3. The method of claim 1, wherein the determining of the first target 3D model comprises:

determining a second similarity between the base 3D model and the plurality of 3D models; and determining, as the first target 3D model, a 3D model having a high second similarity among the plurality of 3D models.

4. The method of claim 1, wherein the generating of the first synthesized 3D model comprises:

performing deformation on the first target 3D model to correspond to the base 3D model; and merging the base 3D model and deformed first target 3D model.

5. The method of claim 1, further comprising:

classifying the base 3D model into a plurality of components of the object.

6. The method of claim 5, wherein the determining of the component having the low similarity comprises:

determining a third similarity between the first synthesized 3D model and the at least one object image with respect to each of the plurality of classified components; and determining, as the component having the low similarity, a component having the third similarity less than a certain value among the plurality of components.

7. The method of claim 1, wherein the determining of the first similarity comprises:

rendering the first synthesized 3D model;

modifying a pose of the rendered first synthesized 3D model to correspond to the at least one object image; and determining the first similarity between the modified rendered first synthesized 3D model and the at least one object image.

8. The method of claim 1, further comprising:

identifying a type of the object, based on the at least one object image, wherein the 3D model database comprises 3D models related to the type of the object.

9. The method of claim 1, wherein the generating of the first synthesized 3D model comprises:

generating information about a location of the first synthesized 3D model, based on information about a location of the base 3D model and information about a location of the first target 3D model; and generating information about a color of the first synthesized 3D model, based on information about a color of the base 3D model.

10. The method of claim 1, wherein the first synthesized 3D model comprises at least one of a point cloud model, a polygon mesh model, a triangle mesh model, a non-uniform rational B-spline (NURBS) model, or a sculpting model.

11. An electronic device for generating a three-dimensional (3D) model, the electronic device comprising:

at least one processor; and a memory storing at least one instruction, wherein the at least one processor is configured to execute the at least one instruction to:

generate a base 3D model of an object, based on at least one object image, determine a first target 3D model similar to the base 3D model from a 3D model database storing a plurality of 3D models, generate a first synthesized 3D model, based on the base 3D model and the first target 3D model, determine a first similarity between the first synthesized 3D model and the at least one object image, determine a component having a low similarity between the first synthesized 3D model and the at least one object image, based on the first similarity being less than or equal to a threshold value, determine, as a second target 3D model, a 3D model having a high similarity to the first synthesized 3D model with respect to the component having the low similarity, from the 3D model database, and generate a second synthesized 3D model based on the first synthesized 3D model and the second target 3D model.

12. The electronic device of claim 11, wherein the at least one processor is further configured to:

execute the at least one instruction to obtain depth information of the at least one object image by using the at least one object image, and generate the base 3D model including 3D location information about at least a portion of the object by using the at least one object image and the obtained depth information.

13. The electronic device of claim 11, wherein the at least one processor is further configured to:

execute the at least one instruction to determine a second similarity between the at least one object image and the plurality of 3D models, and determine, as the first target 3D model, a 3D model having a high second similarity among the plurality of 3D models.

14. The electronic device of claim 11, wherein the at least one processor is further configured to:

execute the at least one instruction to perform deformation on the first target 3D model to correspond to the base 3D model, and merge the base 3D model and the deformed first target 3D model.

15. The electronic device of claim 11, wherein the at least one processor is further configured to execute the at least one instruction to classify the base 3D model into a plurality of components of the object.

16. The electronic device of claim 15, wherein the at least one processor is further configured to:

execute the at least one instruction to determine a third similarity between the first synthesized 3D model and the at least one object image with respect to each of the plurality of classified components, and determine, as the component having the low similarity, a component having the third similarity less than a certain value among the plurality of components.

17. The electronic device of claim 11, wherein the at least one processor is further configured to:

execute the at least one instruction to render the first synthesized 3D model, modify a pose of the rendered first synthesized 3D model to correspond to the at least one object image, and determine the first similarity between the modified rendered first synthesized 3D model and the at least one object image.

18. The electronic device of claim 11, wherein the at least one processor is further configured to execute the at least one instruction to identify a type of the object based on the at least one object image, and wherein the 3D model database comprises 3D models related to the type of the object.

19. The electronic device of claim 11, wherein the at least one processor is further configured to:

execute the at least one instruction to generate information about a location of the first synthesized 3D model, based on information about a location of the base 3D model and information about a location of the first target 3D model, and generate information about a color of the first synthesized 3D model, based on information about a color of the base 3D model.

20. A non-transitory computer-readable recording medium storing a program for performing a method of:

generating a base three-dimensional (3D) model of an object, based on at least one object image;

determining a first target 3D model similar to the base 3D model from a 3D model database storing a plurality of 3D models;

generating a first synthesized 3D model, based on the base 3D model and the first target 3D model;

determining a first similarity between the first synthesized 3D model and the at least one object image;

determining a component having a low similarity between the first synthesized 3D model and the at least one object image, based on the first similarity being less than or equal to a threshold value;

determining, as a second target 3D model, a 3D model having a high similarity to the first synthesized 3D model with respect to the component having the low similarity, from the 3D model database; and generating a second synthesized 3D model, based on the first synthesized 3D model and the second target 3D model.

\* \* \* \* \*